United States Patent [19]

Takayama et al.

[11] Patent Number: 5,400,154
[45] Date of Patent: Mar. 21, 1995

[54] HYBRID INTERPOLATION AND NON-INTERPOLATION METHOD AND APPARATUS FOR IMAGE ENLARGING AND CONTRACTING

[75] Inventors: Hisashi Takayama, Tokyo; Mikio Fujiwara, Kyoto; Takayuki Minemaru, Osaka; Satoshi Takayama, Kawasaki, all of Japan

[73] Assignee: Matsushita Electric Industrial Co., Ltd., Osaka, Japan

[21] Appl. No.: 976,029

[22] Filed: Nov. 13, 1992

[30] Foreign Application Priority Data

Nov. 14, 1991 [JP] Japan .................. 3-298746

[51] Int. Cl.$^6$ .............................. H04N 1/393
[52] U.S. Cl. .................. 358/525; 358/528; 358/451
[58] Field of Search ......... 358/451, 443, 448, 524, 358/525, 528, 518; 382/47, 55; 395/102, 139; H04N 1/393

[56] References Cited

U.S. PATENT DOCUMENTS

| | | | |
|---|---|---|---|
| 4,610,026 | 9/1986 | Tabata et al. | 358/451 |
| 4,809,345 | 2/1989 | Tabata et al. | 358/451 |
| 4,933,775 | 6/1990 | Shimura . | |
| 5,001,575 | 3/1991 | Nakahara . | |
| 5,008,752 | 4/1991 | Van Nostrand | 358/451 |
| 5,200,840 | 4/1993 | Koike et al. | 358/451 |
| 5,311,332 | 5/1994 | Imao et al. | 358/518 |
| 5,315,415 | 5/1994 | Kawai et al. | 358/518 |

FOREIGN PATENT DOCUMENTS 63-282886 11/1988 Japan .

*Primary Examiner*—Edward L. Coles, Sr.
*Assistant Examiner*—Kim Yen Vu
*Attorney, Agent, or Firm*—Lowe, Price, LeBlanc & Becker

[57] ABSTRACT

Image data is processed to enlarge and contract an original image, represented by the data, by P times in an X-axis direction while the data is subjected to interpolation. The letter P denotes an arbitrary positive rational number. It is supposed that each of regions among pixels of the original image is divided into sub areas having a number of N by M, that is, N in the X-axis direction and M in a Y-axis direction. The letter N denotes an arbitrary integer equal to or greater than 2. The letter M denotes an arbitrary integer equal to or greater than 1. An N-time interpolation enlarging device or step serves to execute an interpolation process determined by an original-image sub area corresponding to a pixel of an enlargement/contraction-resultant image while simultaneously generating a plurality of pieces of process-resultant data representing a part of an image enlarged from the original image by N times in the X-axis direction. An arbitrary-magnification enlarging/contracting device or step serves to subject the plurality of the pieces of the process-resultant data to image enlargement and contraction at an arbitrary magnification in the X-axis direction without executing interpolation, and also serves to process the plurality of the pieces of the process-resultant data to enlarge and contract an image, represented by the plurality of the pieces of the process-resultant data, by P/N times in the X-axis direction.

33 Claims, 21 Drawing Sheets

POSITION CORRESPONDING TO PIXEL OF ENLARGEMENT/ CONTRACTION-RESULTANT IMAGE

FIG. 13

| SELECTION MODE | COUNTER VALUE SELECT (0:1) | SELECTED DATA — PRECEDING MAIN DATA REGISTER / MAIN DATA REGISTER / PRECEDING UPPER/LOWER DATA REGISTER / UPPER/LOWER DATA REGISTER |
|---|---|---|
| MODE 1 | SELECT (0:1)=0 | Main row: PMDATA11 … PMDATA15, MDATA0, MDATA1, MDATA2, MDATA3, MDATA4 … MDATA15 (selected: PMDATA15, MDATA0–MDATA3); Lower row: PTBDATA12 … PTBDATA15, TBDATA0, TBDATA1, TBDATA2, TBDATA3 … TBDATA15 (selected: TBDATA0–TBDATA3) |
| MODE 2 | SELECT (0:1)=1 | Main row: PMDATA11 … PMDATA15, MDATA0 … MDATA3, MDATA4, MDATA5, MDATA6, MDATA7, MDATA8 … MDATA15 (selected: MDATA3–MDATA8); Lower row: PTBDATA12 … PTBDATA15, TBDATA0 … TBDATA15 (selected: TBDATA4–TBDATA7) |
| MODE 3 | SELECT (0:1)=2 | Main row: PMDATA11 … PMDATA15, MDATA0 … MDATA15 (selected: MDATA7–MDATA12); Lower row: PTBDATA12 … PTBDATA15, TBDATA0 … TBDATA15 (selected: TBDATA8–TBDATA11) |
| MODE 4 | SELECT (0:1)=3 | Main row: PMDATA11, PMDATA12, PMDATA13, PMDATA14, PMDATA15, MDATA0 … MDATA15 (selected: PMDATA11–PMDATA15, MDATA0); Lower row: PTBDATA12, PTBDATA13, PTBDATA14, PTBDATA15, TBDATA0 … TBDATA15 (selected: PTBDATA12–PTBDATA15, TBDATA0) |

ORIGINAL IMAGE REGION
WORD BOUNDARY

☐ : "0"
▧ : "1"

WORD BOUNDARY

TO REGISTER 142

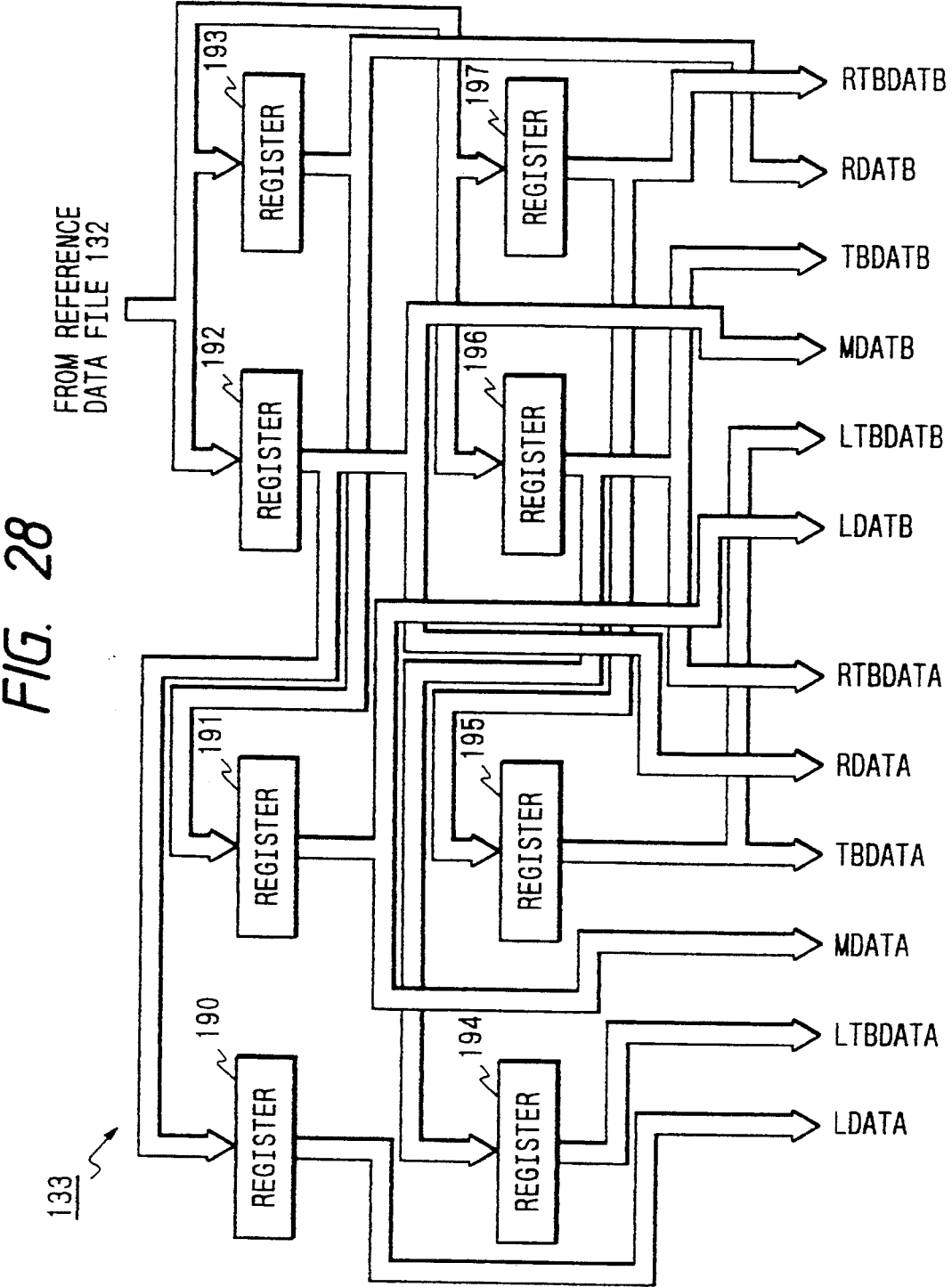

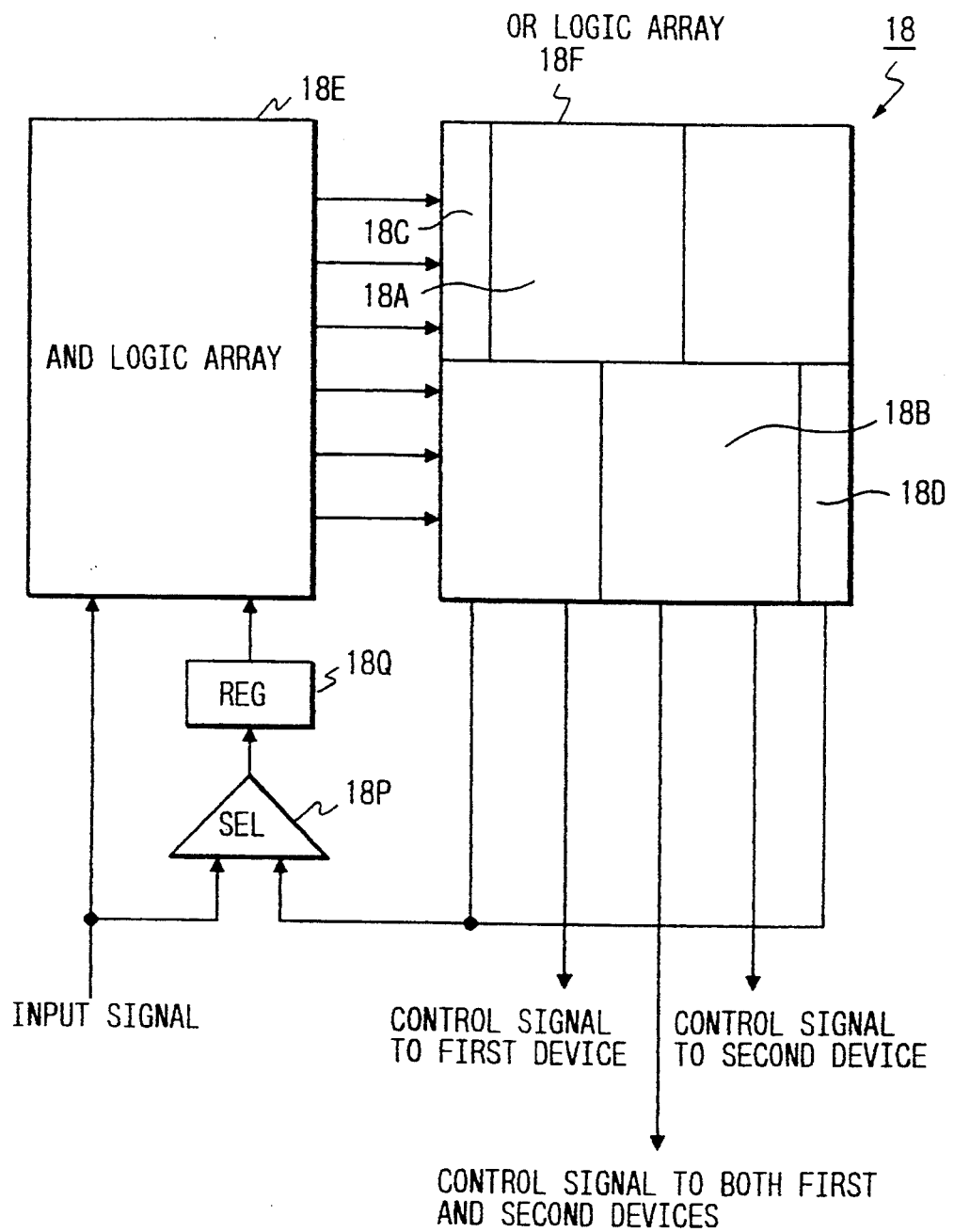

HYBRID INTERPOLATION AND NON-INTERPOLATION METHOD AND APPARATUS FOR IMAGE ENLARGING AND CONTRACTING

BACKGROUND OF THE INVENTION

1. Field of the Invention

This invention relates to an apparatus for processing image data to enlarge and contract an image represented by the data. This invention also relates to a method of processing image data to enlarge and contract an image represented by the data.

2. Description of the Prior Art

It is well-known to use interpolation in processing image data to enlarge and contract an image represented by the data. Japanese published unexamined patent application 63-282886 discloses interpolation designed for such a purpose.

According to the interpolation disclosed by Japanese patent application 63-282886, each of areas among pixels of a whole original-image (source-image) region is divided into small segments or sub areas, and reference tables contain information of determining which of adjacent pixels should be selected for each sub area. The total number of the reference tables corresponds to the number of different combinations of pieces of adjacent-pixel information. The reference tables are provided in a ROM. For each pixel which will occur after an enlarging/contracting process (a pixel of an enlargement-/contraction-resultant image or an object image), a corresponding original-image sub area is determined, and a reference table is selected which corresponds to a combination of adjacent pixels of the sub area. Then, information of determining which of the adjacent pixels should be selected in accordance with the sub area is read out from the reference table. Data of the adjacent pixel which is selected according to the information is written into a memory as pixel data representing a segment of the enlargement/contraction-resultant image.

The interpolation disclosed by Japanese patent application 63-282886 has a problem as follows. In the case of enlargement/contraction with an arbitrary magnification, for each pixel of an enlargement/contraction-resultant image, a corresponding original-image sub area needs to be determined. In addition, for each determined sub area, it is necessary to perform access to the ROM to select a reference table corresponding to a combination of adjacent pixels. In this way, an interpolating step is executed for each pixel of the enlargement-/contraction-resultant image. Thus, in the case where such interpolating steps are required to be simultaneously executed on eight different pixels, it is necessary to simultaneously determine corresponding original-image sub areas for the eight pixels and also it is necessary to previously provide eight ROM's storing reference tables.

U.S. Pat. No. 4,933,775 discloses an image enlarging or contracting method which includes the steps of obtaining groups of interpolated image signal components along every array of original picture elements so that the interpolated picture elements corresponding to the interpolated image signal components of each group are deviated in position in a predetermined direction from the interpolated picture elements corresponding to the interpolated image signal components of every other group. A calculation is given of a mean value of the values of the interpolated image signal components corresponding to a set of the interpolated picture elements, which belong to different groups of the interpolated image signal components and which correspond to one another. The calculation of the mean value is repeated for every other set of the interpolated picture elements, thereby to ultimately obtain a group of the interpolated image signal components, which are to be used for image enlargement or contraction, along every array of the original picture elements.

SUMMARY OF THE INVENTION

It is an object of this invention to provide an improved apparatus for processing image data to enlarge and contract an image represented by the data.

It is another object of this invention to provide an improved method of processing image data to enlarge and contract an image represented by the data.

A first aspect of this invention provides an apparatus for processing image data to enlarge and contract an original image, represented by the data, by P times in an X-axis direction while interpolating the data, P denoting an arbitrary positive rational number, the apparatus comprising means for allowing a supposition that each of regions among pixels of the original image is divided into sub areas having a number of N by M, that is, N in the X-axis direction and M in a Y-axis direction, N denoting an arbitrary integer equal to or greater than 2, M denoting an arbitrary integer equal to or greater than 1; an N-time interpolation enlarging means for executing an interpolation process determined by an original-image sub area corresponding to a pixel of an enlargement/contraction-resultant image while simultaneously generating a plurality of pieces of process-resultant data representing a part of an image enlarged from the original image by N times in the X-axis direction; and an arbitrary-magnification enlarging/contracting means for subjecting the plurality of the pieces of the process-resultant data to image enlargement and contraction at an arbitrary magnification in the X-axis direction without executing interpolation, and thereby for processing the plurality of the pieces of the process-resultant data to enlarge and contract an image, represented by the plurality of the pieces of the process-resultant data, by P/N times in the X-axis direction.

A second aspect of this invention provides an apparatus for processing image data to enlarge and contract an original image, represented by the data, by P times in an X-axis direction and Q times in a Y-axis direction while interpolating the data, P and Q denoting arbitrary positive rational numbers respectively, the apparatus comprising means for allowing a supposition that each of regions among pixels of the original image is divided into sub areas having a number N by M, that is, N in the X-axis direction and M in a Y-axis direction, N denoting an arbitrary integer equal to or greater than 2, M denoting an arbitrary integer equal to or greater than 1; an N-time interpolation enlarging means for executing an interpolation process determined by an original-image sub area corresponding to a pixel of an enlargement-/contraction-resultant image while simultaneously generating a plurality of pieces of process-resultant data representing a part of an image enlarged from the original image by N times in the X-axis direction; an arbitrary-magnification enlarging/contracting means for subjecting the plurality of the pieces of the process-resultant data to image enlargement and contraction at an arbitrary magnification in the X-axis direction without executing interpolation, and thereby for processing the plurality of the pieces of the process-resultant data to enlarge and contract an image, represented by the plurality of the pieces of the process-resultant data, by P/N times in the X-axis direction; a sub-area row calculating means for calculating a row number of an original-image sub area corresponding to pixels in a same row of an enlargement/contraction-resultant image, the row extending in the X-axis direction; a reference data address generating means for generating addresses of pixel data on a source-image memory to which the N-time interpolation enlarging means refers; a selecting means for selecting a plurality of data from among data read out from the source-image memory as reference data, wherein the reference data selected by the selecting means are referred to by the N-time interpolation enlarging means every process; a write data address generating means for generating an address on an object-image memory into which data processed by the arbitrary-magnification enlarging/contracting means is written; and a control means for controlling transfer of the plurality of the image data from the N-time interpolation enlarging means to the arbitrary-magnification enlarging/contracting means.

A third aspect of this invention provides an apparatus for processing image data to enlarge and contract an original image, represented by the data, by P times in an X-axis direction and Q times in a Y-axis direction while interpolating the data, P and Q denoting arbitrary positive rational numbers respectively, the apparatus comprising means for allowing a supposition that each of regions among pixels of the original image is divided into sub areas having a number N by M, that is, N in the X-axis direction and M in a Y-axis direction, N denoting an arbitrary integer equal to or greater than 2, M denoting an arbitrary integer equal to or greater than 1; an N-time interpolation enlarging means for executing an interpolation process determined by an original-image sub area corresponding to a pixel of an enlargement/contraction-resultant image while simultaneously generating a plurality of pieces of process-resultant data representing a part of an image enlarged from the original image by N times in the X-axis direction; an arbitrary-magnification enlarging/contracting means for subjecting the plurality of the pieces of the process-resultant data to image enlargement and contraction at an arbitrary magnification in the X-axis direction without executing interpolation, and thereby for processing the plurality of the pieces of the process-resultant data to enlarge and contract an image, represented by the plurality of the pieces of the process-resultant data, by P/N times in the X-axis direction; a sub-area row calculating means for calculating a row number of an original-image sub area corresponding to pixels in a same row of an enlargement/contraction-resultant image, the row extending in the X-axis direction; a reference data address generating means for generating addresses of pixel data on a source-image memory to which the N-time interpolation enlarging means refers; a selecting means for selecting a plurality of data from among data read out from the source-image memory as reference data, wherein the reference data selected by the selecting means are referred to by the N-time interpolation enlarging means every process; a write data address generating means for generating an address on an object-image memory into which data processed by the arbitrary-magnification enlarging/contracting means is written; a control means for controlling transfer of the plurality of the image data from the N-time interpolation enlarging means to the arbitrary-magnification enlarging/contracting means; and an interpolation information adding means for adding information to original-image data read out from the source-image memory, the information representing the sub-area row number calculated by the sub-area row calculating means; wherein the N-time interpolation enlarging means processes the original-image data into the plurality of the pieces of the process-resultant data on the basis of the information added by the interpolation information adding means, and the arbitrary-magnification enlarging/contracting means processes the plurality of the pieces of the process-resultant data to enlarge and contract an image, represented by the plurality of the pieces of the process-resultant data, by P/N times in the X-axis direction.

A fourth aspect of this invention provides an apparatus for processing image data to enlarge and contract an original image, represented by the image data, by P times in a given direction while interpolating the image data, P denoting a predetermined positive rational number, the apparatus comprising an N-time interpolation enlarging means for interpolating the image data into first process-resultant data representing a first process-resultant image enlarged from the original image by N times in the given direction, wherein the N-time interpolation enlarging means comprises means for simultaneously generating a plurality of pieces of the first process-resultant data; and a P/N-time non-interpolation enlarging/contracting means for processing the first process-resultant data into second process-resultant data without interpolation, the second process-resultant data representing a second process-resultant image enlarged or contracted from the first process-resultant image by P/N times in the given direction.

A fifth aspect of this invention provides an apparatus for processing image data to enlarge and contract an original image, represented by the image data, by P times in an X-axis direction while interpolating the image data, P denoting a predetermined positive rational number, the image data representing states of respective pixels of the original image, the apparatus comprising means for dividing each of regions among pixels of the original image into sub areas having a number of N by M, that is, N in the X-axis direction and M in a Y-axis direction perpendicular to the X-axis direction, N denoting a predetermined integer equal to or greater than 2, M denoting a predetermined integer equal to or greater than 1; an N-time interpolation enlarging means for interpolating the image data into first process-resultant data representing states of respective pixels of a first process-resultant image enlarged from the original image by N times in the X-axis direction, wherein the N-time interpolation enlarging means comprises means for determining a sub area of the original image which corresponds to each interpolated pixel of the first process-resultant image, means for determining a state of the interpolated pixel of the first-process-resultant image on the basis of states of pixels of the original image which are adjacent to the determined sub area of the original image, and means for simultaneously generating a plurality of pieces of the first process-resultant data which represent states of a plurality of pixels of the first process-resultant image; and a P/N-time enlarging/contracting means for processing the first process-resultant data into second process-resultant data without interpolation, the second process-resultant data representing states of respective pixels of a second process-resultant image enlarged or contracted from the first process-resultant image by P/N times in the X-axis direction.

A sixth aspect of this invention provides a method of processing image data to enlarge and contract an original image, represented by the image data, by P times in a given direction while interpolating the image data, P denoting a predetermined positive rational number, the method comprising the steps of interpolating the image data into first process-resultant data representing a first process-resultant image enlarged from the original image by N times in the given direction, wherein the interpolating step comprises simultaneously generating a plurality of pieces of the first process-resultant data; and processing the first process-resultant data into second process-resultant data without interpolation, the second process-resultant data representing a second process-resultant image enlarged or contracted from the first process-resultant image by P/N times in the given direction.

BRIEF DESCRIPTION OF THE DRAWINGS

FIG. 13 is a diagram of the relation among a selection mode, a value SELECT(0:1), and selected data.

FIG. 28 is a block diagram of a reference data selector in FIG. 20.

FIG. 29 is a block diagram of a part of a controller in FIG. 1.

DESCRIPTION OF THE FIRST PREFERRED EMBODIMENT

An image enlarging/contracting apparatus according to a first embodiment of this invention processes bi-level (two-level) image data. One bit of the image data corresponds to a pixel, and assumes either a state "1" (for example, black) or a state "0" (for example, white). The image enlarging/contracting apparatus includes image memories (a source-image memory and an object-image memory) which are designed so that access to the image memories can be performed word by word, where one word is composed of image data of 16 pixels in a same line or row. Thus, a word corresponds to 16 bits.

Figure 1:
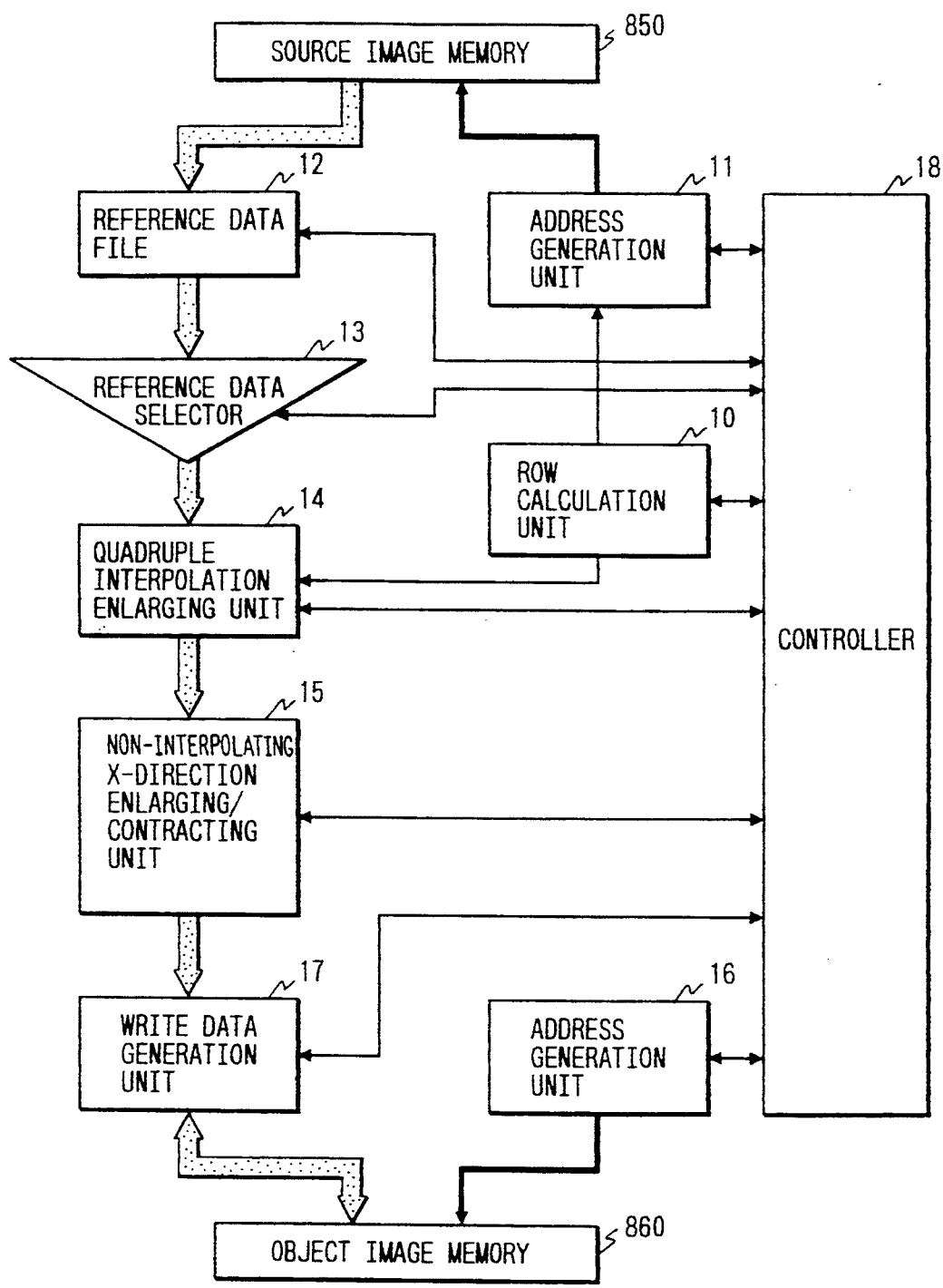
FIG. 1 is a block diagram of an image enlarging/contracting apparatus according to a first embodiment of this invention.

FIG. 1 shows the image enlarging/contracting apparatus which includes a sub-area row calculation unit 10, a reference data address generation unit 11, a reference data file 12, a reference data selector 13, a quadruple interpolation enlarging unit 14, an X-direction enlarging/contracting unit 15, a write data address generation unit 16, a write data generation unit 17, and a controller 18.

The sub-area row calculation unit 10 is connected to the controller 18, the reference data address generation unit 11, and the quadruple interpolation enlarging unit 14. It is supposed that each of areas among pixels of a whole original-image (source-image) region is divided into a set of small segments referred to as sub areas. The sub-area row calculation unit 10 serves to calculate a row number of original-image sub areas corresponding to a row of pixels of a process-resultant (enlargement-/contraction-resultant) image, that is, an object image. The reference data address generation unit 11 is connected to the sub-area row calculation unit 10, the controller 18, and a source-image memory 850. The source-image memory 850 stores data representing an original image, that is, a source image. The reference data address generation unit 11 serves to generate updatable addresses of 1-word storage segments of the source-image memory 850 which store reference data representing a window of the original image. The reference data file 12 is connected to the reference data selector 13, the controller 18, and the source-image memory 850. The reference data file 12 serves to store the reference data (the original-image data in the window) which is read out from the source-image memory 850. The reference data selector 13 is connected to the reference data file 12, the quadruple interpolation enlarging unit 14, and the controller 18. The reference data selector 13 serves to select reference data from among the reference data (the original-image data in the window) in the reference data file 12 which will be referred to by one quadruple interpolation enlarging process. The quadruple interpolation enlarging unit 14 is connected to the sub-area row calculation unit 10, the reference data selector 13, the X-direction enlarging/contracting unit 15, and the controller 18. The quadruple interpolation enlarging unit 14 serves to subject the reference data to an interpolation process of quadruple enlargement in an X-axis direction (a horizontal direction). The X-direction enlarging/contracting unit 15 is connected to the quadruple interpolation enlarging unit 14, the write data generation unit 17, and the controller 18. The X-direction enlarging/contracting unit 15 serves to execute a process of enlargement and contraction with an arbitrary magnification in the X-axis direction without performing interpolation. The write data address generation unit 16 is connected to the controller 18 and an object-image memory 860. The object-image memory 860 serves to store data representing a process-resultant (enlargement/contraction-resultant) image, that is, an object image. The write data address generation unit 16 serves to generate an updatable address of a 1-word storage segment of the object-image memory 860 into which process-resultant data will be written. The write data generation unit 17 is connected to the X-direction enlarging/contracting unit 15, the controller 18, and the object-image memory 860. The write data generation unit 17 serves to subject data to logic operation and masking operation. The controller 18 is connected to the devices 10–17. The controller 18 serves to control operation of the devices 10–17. The controller 18 includes a suitable device such as a programmable logic array (PLA).

A description will now be given of the case where an original image is enlarged or contracted by P times in the X-axis direction and Q times in a Y-axis direction (a vertical direction) perpendicular to the X-axis direction. Letters P and Q denote arbitrary rational numbers. First, the sub-area row calculation unit 10 calculates a row number of original-image sub areas corresponding to a row of pixels of a process-resultant (enlargement-/contraction-resultant) image, that is, an object image, on the basis of the magnification Q in the Y-axis direction. The sub-area row calculation unit 10 informs the reference data address generation unit 11 of the calculated row number. The reference data address generation unit 11 generates addresses of two 1-word storage segments in two adjacent rows of the source-image memory 850 on the basis of the calculated row number. The reference data address generation unit 11 outputs the generated addresses to the source-image memory 850, so that two pieces of 1-word reference data (that is, 2-word reference data) are read out from the two 1-word storage segments of the source-image memory 850 which are designated by the addresses respectively.

The 2-word readout data is stored into the reference data file 12. The 2-word data is transferred from the reference data file 12 to registers within the reference data selector 13, being selected therein 10 bits by 10 bits as reference data which will be used by the quadruple interpolation enlarging unit 14. The selected 10-bit reference data is converted and interpolated into 16-bit data by the quadruple interpolation enlarging unit 14. The 16-bit data generated by the quadruple interpolation enlarging unit 14 corresponds to data representing an image which is enlarged or contracted from the original image by a quadruple in the X-axis direction and Q times in the Y-axis direction. The quadruple interpolation enlarging unit 14 outputs the 16-bit data to the X-direction enlarging/contracting unit 15. The X-direction enlarging/contracting unit 15 subjects the 16-bit data to a process corresponding to enlargement or contraction by P/4 times in the X-axis direction without any interpolation, so that the 16-bit data is converted into first process-resultant data representing an image which is enlarged or contracted from the original image by P times in the X-axis direction and Q times in the Y-axis direction. Before the generation of the first process-resultant data by the X-direction enlarging/contracting unit 15, the write data address generation unit 16 generates an address of a 1-word storage segment of the object-image memory 860 into which second process-resultant data will be written. The write data address generation unit 16 outputs the generated address to the object-image memory 860, so that word data is read out from the 1-word storage segment of the object-image memory 860 which is designated by the address. The readout word data is fed to the write data generation unit 17. In addition, the write data generation unit 17 receives the first process-resultant data from the X-direction enlarging/contracting unit 15. The write data generation unit 17 executes logic operation and masking operation between the read-out word data and the first process-resultant data, thereby converting the first process-resultant data into second process-resultant data. The write data generation unit 17 outputs the second process-resultant data to the object-image memory 860. While the write data address generation unit 16 outputs the generated address to the object-image memory 860, the second process-resultant data (the object-image data) is written into the 1-word storage segment of the object-image memory 860 which is designated by the address respectively.

As described previously, the operations of the devices 10–17 are controlled by the controller 18. During the control of the operations of the devices 10–17, the controller 18 outputs control signals to the devices 10–17 while the devices 10–17 output responsive flag signals to the controller 18. The control of the operations of the devices 10–17 is designed so that the devices 10–17 can execute their processing functions in parallel to each other, that is, execute their processing functions simultaneously.

The quadruple interpolation enlarging unit 14 will now be described in detail. Regarding the interpolation processing executed by the quadruple interpolation enlarging unit 14, each of areas among pixels of a whole original-image region is divided into 16 sub areas (4 by 4 sub areas, that is, 4 sub areas in the X direction and 4 sub areas in the Y direction). The interpolation processing includes a step of determining interpolation equations of 16 different types for each sub area. In the interpolation equations, pieces of data of adjacent pixels are used as variables. The interpolation processing also includes a step of referring to the interpolation equations and executing interpolation calculation determined by an original-image sub area corresponding to a pixel of a process-resultant (enlargement/contraction-resultant) image. The execution of the interpolation calculation generates interpolation data.

Figure 2:
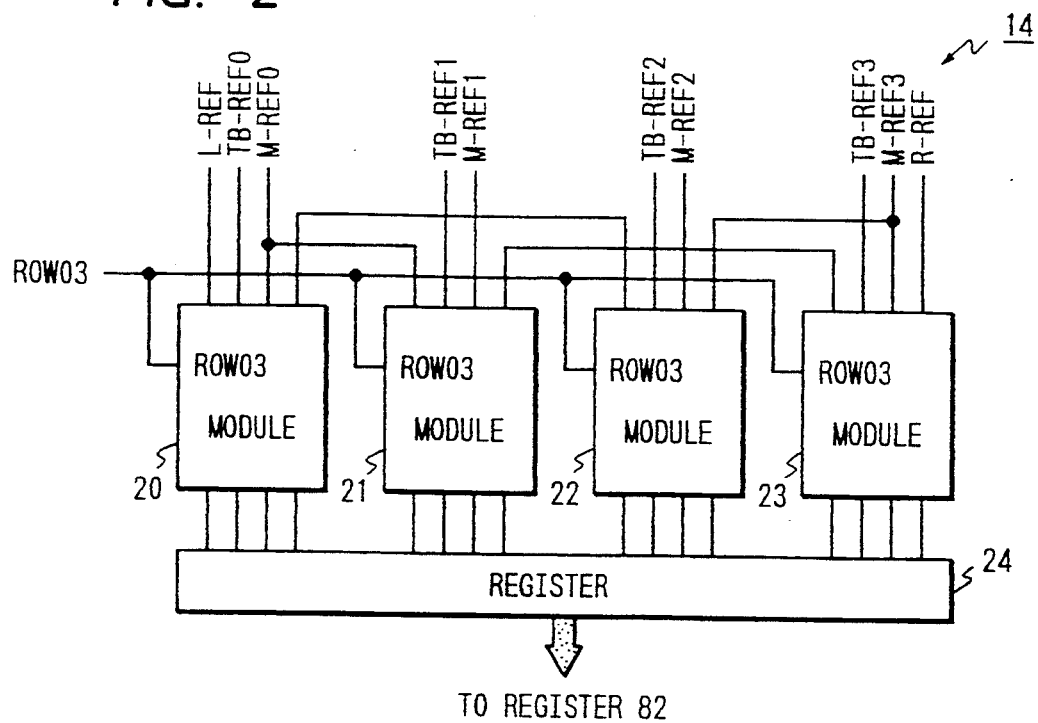
FIG. 2 is a block diagram of a quadruple interpolation enlarging unit in FIG. 1.
Figure 3:
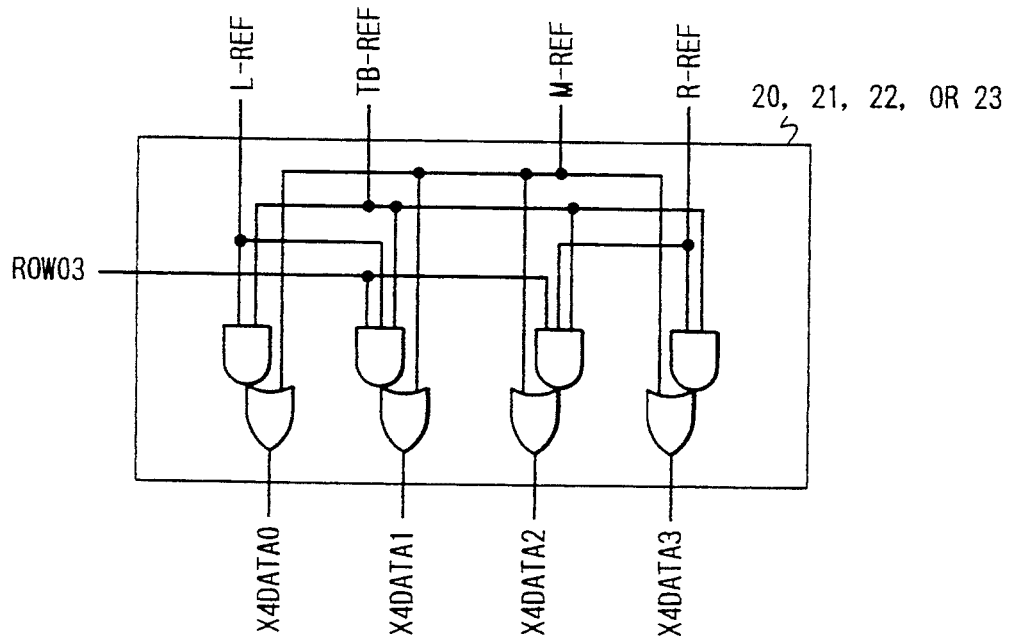
FIG. 3 is a diagram of a quadruple interpolation enlarging module in FIG. 2.

As shown in FIG. 2, the quadruple interpolation enlarging unit 14 includes quadruple interpolation enlarging modules 20, 21, 22, and 23, and a register 24. The quadruple interpolation enlarging modules 20, 21, 22, and 23 execute logic operation among reference data bits L-REF, TB-REF0, M-REF0, TB-REF1, M-REF1, TB-REF2, M-REF2, TB-REF3, M-REF3, and R-REF, and 1-bit row data (row number) ROW03, thereby generating 16-bit data which is stored into the register 24. The quadruple interpolation enlarging modules 20, 21, 22, and 23 have similar internal structures, and only one of them will be described in detail hereinafter. As shown in FIG. 3, one quadruple interpolation enlarging module includes a combination of logic gates which executes logic operation among reference data bits L-REF, TB-REF, M-REF, and R-REF, and the 1-bit row data ROW03, and thereby which generates data having four bits X4DATA0, X4DATA1, X4DATA2, and X4DATA3. The logic operation executed by one quadruple interpolation enlarging module corresponds to interpolation equations of 16 different types.

Figure 4:
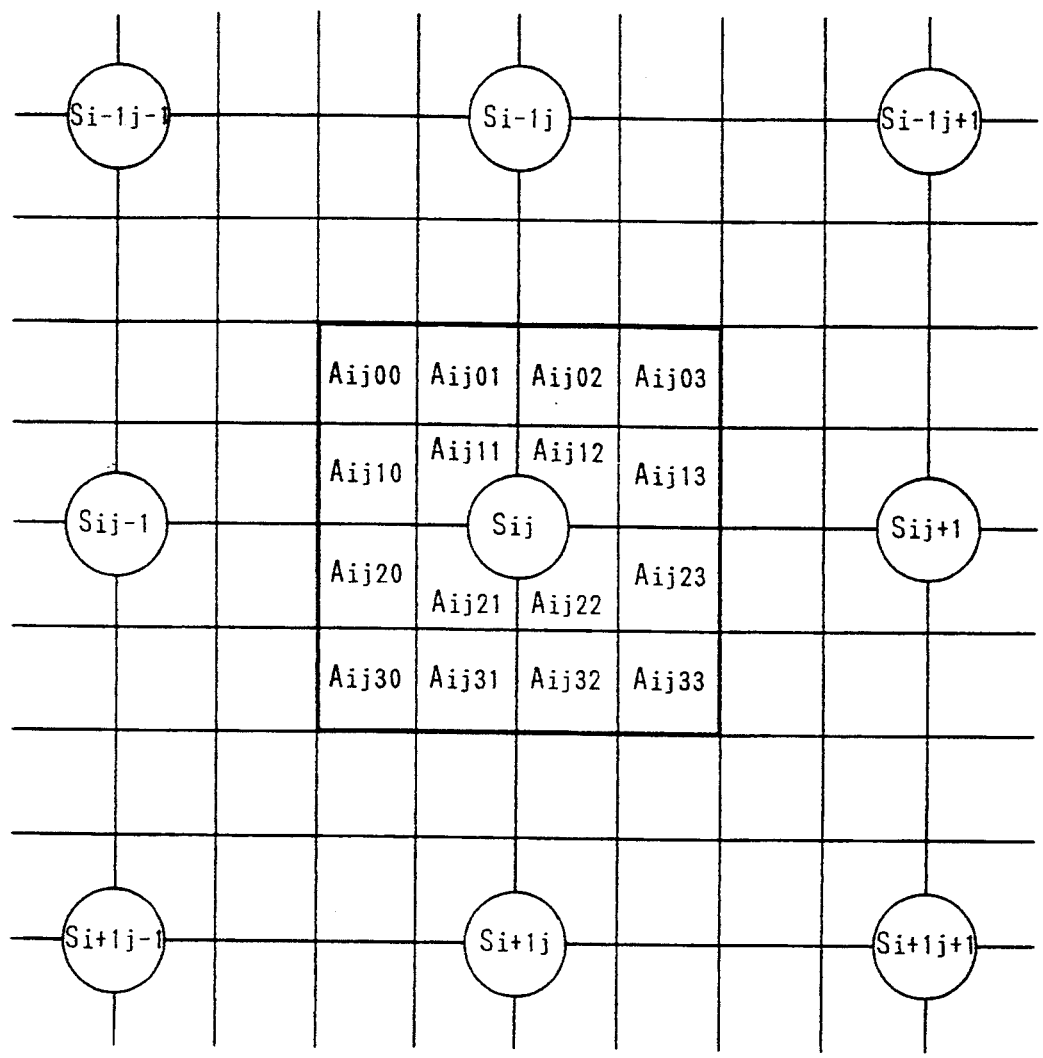
FIG. 4 is a diagram of an array of sub areas and pixels in the image enlarging/contracting apparatus of FIG. 1.

The operation of one quadruple interpolation enlarging module will now be described in detail. With reference to FIG. 4, the character Sij denotes data of a pixel of an original image which exists at a position corresponding to an i-th row and a j-th column, and the position of the pixel coincides with a lattice point. The letters "i" and "j" denote integers greater than "0" respectively. As described previously, each of areas among pixels is divided into sub areas. Sixteen sub areas around the lattice point (the pixel position) Sij are denoted by Aijmn, where m=0, 1, 2, 3 and n=0, 1, 2, 3. The row of a sub area is represented by "i" and "m", and the column thereof is represented by "j" and "n".

Pieces F(Aijmn) of interpolation data are determined for sub areas Aijmn respectively, and are calculated from the data Sij of the pixel of interest and data $Si-1j$, $Sij-1$, $Si+1j$, and $Sij+1$ of pixels neighboring the pixel of interest according to interpolation equations (1)–(16) expressed as follows.

$$F(Aij00) = Sij + (Si-1j \bullet Sij-1) \quad (1)$$

$$F(Aij10) = Sij + (Si-1j \bullet Sij-1) \quad (2)$$

$$F(Aij20) = Sij + (Si+1j \bullet Sij-1) \quad (3)$$

$$F(Aij30) = Sij + (Si+1j \bullet Sij-1) \quad (4)$$

$$F(Aij01) = Sij + (Si-1j \bullet Sij-1) \quad (5)$$

$$F(Aij11) = Sij \quad (6)$$

$$F(Aij21) = Sij \quad (7)$$

$$F(Aij31) = Sij + (Si+1j \bullet Sij-1) \quad (8)$$

$$F(Aij02) = Sij + (Si-1j \bullet Sij+1) \quad (9)$$

$$F(Aij12) = Sij \quad (10)$$

$$F(Aij22) = Sij \quad (11)$$

$$F(Aij32) = Sij + (Si+1j \bullet Sij+1) \quad (12)$$

$$F(Aij03) = Sij + (Si-1j \bullet Sij+1) \quad (13)$$

$$F(Aij13) = Sij + (Si-1j \bullet Sij+1) \quad (14)$$

$$F(Aij23) = Sij + (Si+1j \bullet Sij+1) \quad (15)$$

$$F(Aij33) = Sij + (Si+1j \bullet Sij+1) \quad (16)$$

In the interpolation equations (1)–(16), the character "+" denotes OR operation between pixel data, and the character "•" denotes AND operation between pixel data.

According to the interpolation based on the equations (1)–(16), in the case where a point within an original-image area which corresponds to a pixel of a process-resultant image exists in one of sub areas Aij00, Aij10, and Aij01, data of the pixel of the process-resultant image is set to "1" when Sij is "1" or when Sij is "0" but both $Si-1j$ and $Sij-1$ are "1", and is set to "0" otherwise. In the case where a point within an original-image area which corresponds to a pixel of a process-resultant image exists in one of sub areas Aij03, Aij13, and Aij02, data of the pixel of the process-resultant image is set to "1" when Sij is "1" or when Sij is "0" but both $Si-1j$ and $Sij+1$ are "1", and is set to "0" otherwise. In the case where a point within an original-image area which corresponds to a pixel of a process-resultant image exists in one of sub areas Aij30, Aij20, and Aij31, data of the pixel of the process-resultant image is set to "1" when Sij is "1" or when Sij is "0" but both $Si+1j$ and $Sij-1$ are "1", and is set to "0" otherwise. In the case where a point within an original-image area which corresponds to a pixel of a process-resultant image exists in one of sub areas Aij33, Aij23, and Aij32, data of the pixel of the process-resultant image is set to "1" when Sij is "1" or when Sij is "0" but both $Si+1j$ and $Sij+1$ are "1", and is set to "0" otherwise. In the case where a point within an original-image area which corresponds to a pixel of a process-resultant image exists in one of sub areas Aij11, Aij21, Aij12, and Aij22, data of the pixel of the process-resultant image is set equal to Sij. This interpolation enables smoothing steps which would be caused by enlargement without interpolation.

Figure 5:
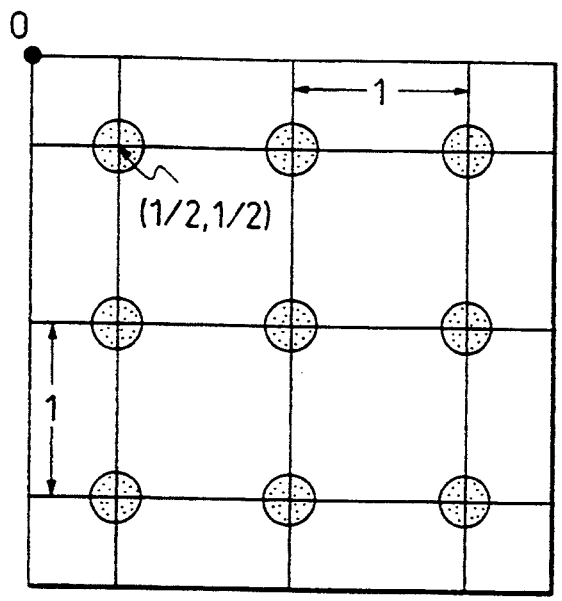
FIG. 5 is a diagram of an array of pixels of an original image.
Figure 6:
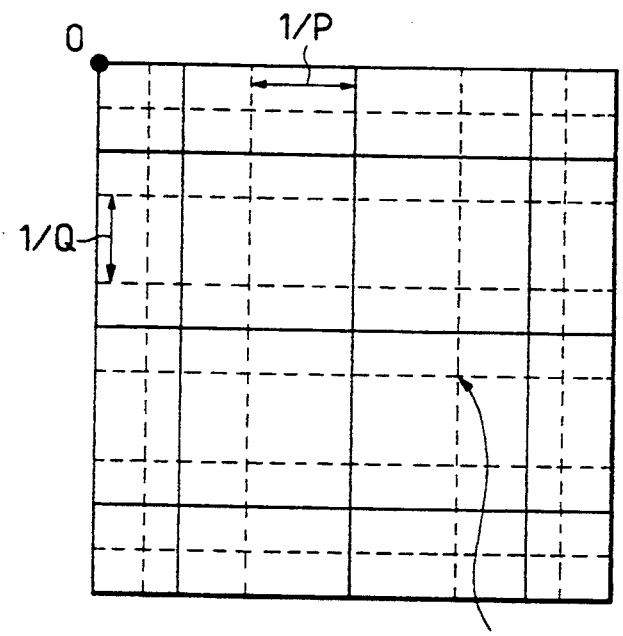
FIG. 6 is a diagram of the relation between pixels of an original image and pixels of an enlargement/contraction-resultant image.

A consideration will now be given of an original image where, as shown in FIG. 5, the intervals between adjacent pixels are equal to "1" and the coordinates of the left upper pixel are ($\frac{1}{2}$, $\frac{1}{2}$) with respect to the origin O. In the case where an area of the original image is enlarged or contracted by P times in an X-axis direction and Q times in a Y-axis direction (P and Q denote arbitrary positive rational numbers), original-image points to which pixels of an enlargement/contraction-resultant image correspond are coincident with lattice points (pixels) resulting from enlarging or contracting the original-image lattice by 1/P times in the X-axis direction and 1/Q times in the Y-axis direction while the origin O is used as a center (see FIG. 6).

Figure 7:
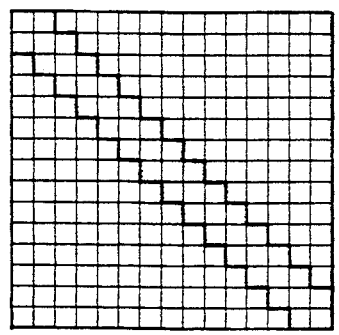
FIG. 7 is a diagram of an example of an original image.
Figure 8:
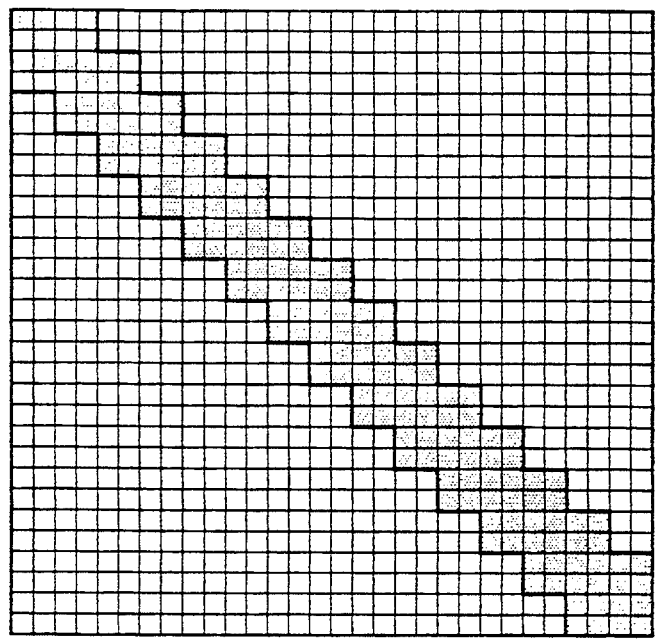
FIG. 8 is a diagram of an image which is enlarged double in an X-axis direction and also double in a Y-axis direction from the original image of FIG. 7 without the execution of interpolation.
Figure 9:
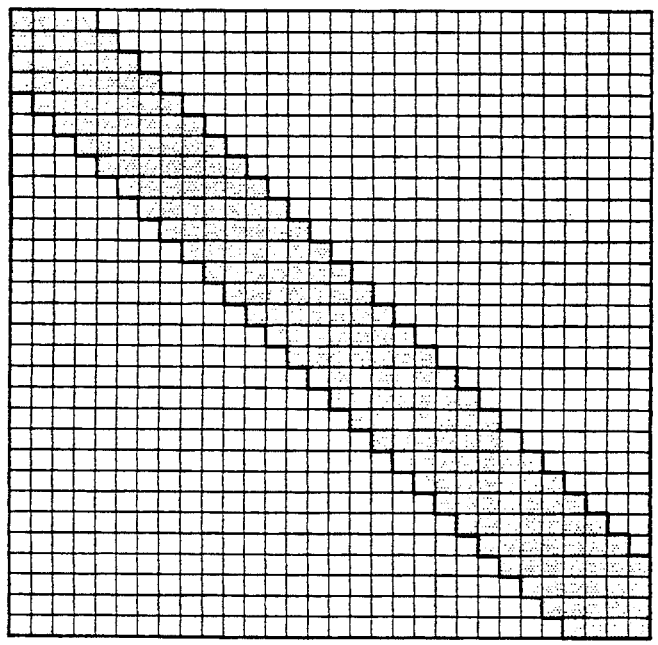
FIG. 9 is a diagram of an image which is enlarged double in the X-axis direction and also double in the Y-axis direction from the original image of FIG. 7 with the execution of interpolation by the image enlarging/contracting apparatus of FIG. 1.

FIG. 7 shows an example of an original image which includes a black partial line having a slope of 45 degrees and also having steps with a size corresponding to one pixel. FIG. 8 shows an image which results from enlarging the original image of FIG. 7 double in an X-axis direction and also double in a Y-axis direction without using interpolation. In the enlargement-resultant image of FIG. 8, steps in a black partial line have a size corresponding to two pixels. FIG. 9 shows an image which results from enlarging the original image of FIG. 7 double in the X-axis direction and also double in the Y-axis direction with executing the interpolation based on the equations (1)–(16). In the enlargement-resultant image of FIG. 9, steps in a black partial line have a size corresponding to one pixel. It is understood from the comparison between FIG. 8 and FIG. 9 that the interpolation provides smoothed edges of segments of a process-resultant image.

A consideration will now be given of the case where the area of the original image of FIG. 5 is enlarged or contracted by a quadruple in the X-axis direction and by Q times in the Y-axis direction. The character Dst denotes a pixel of an enlargement/contraction-resultant image which is in an s-th row and a t-th column. The coordinates of a point in the original-image area which corresponds to the pixel Dst of the enlargement/contraction-resultant image agree with a lattice point in a coordinate system where lattice intervals in the X-axis direction are equal to ¼ and lattice intervals in the Y-axis direction are equal to 1/Q. When that lattice point exists in a sub area Aijmn, there are relations among the numbers "s", "t", "i", "j", "m", and "n" which are expressed by the hereafter-indicated equations (17) and (18) provided that each sub area contains the boundary with a left neighboring sub area and the boundary with an upper neighboring sub area but does not contain the boundary with a right neighboring sub area and the boundary with a lower neighboring sub area.

$$[4s/Q] = 4i + m \quad (17)$$

$$t = 4j + n \quad (18)$$

In the equation (17), the character [..] denotes Gauss' notation so that [4s/Q] represents the largest integer not greater than the value 4s/Q.

Data of the pixel Dst is calculated from data of a corresponding original-image sub area according to the interpolation equations (1)–(16). When the relations (17) and (18) are satisfied, the pixel data Dst has the following relation (19) with other data.

$$\begin{aligned}
Dst &= Ds4j + n \quad (19)\\
&= F(Aijmn)\\
&= Sij + \delta m0 \{(\delta m0 + \delta m1)(Si-1j \cdot Sij-1) +\\
&\quad (\delta m2 + \delta m3)(Si+1j \cdot Sij-1)\} +\\
&\quad \delta n1\{\delta m0(Si-1j \cdot Sij-1) + \delta m3(Si+1j \cdot Sij-1)\}\\
&\quad + \delta n2\{\delta m0(Si-1j \cdot Sij+1) + \delta m3(Si+1j \cdot Sij+1)\}\\
&\quad + \delta n3 \{(\delta m0 + \delta m1)(Si-1j \cdot Sij+1) +\\
&\quad (\delta m2 + \delta m3)(Si+1j \cdot Sij+1)\}
\end{aligned}$$

where the character $\delta mn$ denotes a value which equals "1" when m=n and which equals "0" otherwise.

It is understood from the equation (19) that the coordinates of points within the original-image area which correspond to pixels Ds4j, Ds4j+1, Ds4j+2, and Ds4j+3 of the enlargement/contraction-resultant image exist in the sub areas Aijm0, Aijm1, Aijm2, and Aijm3 respectively, and that neighboring pixels in a same row of the enlargement/contraction-resultant image correspond to different original-image sub areas respectively which neighbor each other and which are in a same row. Thus, provided that the row of the original-image sub areas corresponding to the pixels Ds4j, Ds4j+1, Ds4j+2, and Ds4j+3 of the enlargement/contraction-resultant image is determined, the corresponding original-image sub areas can be determined and also the data of the pixels Ds4j, Ds4j+1, Ds4j+2, and Ds4j+3 of the enlargement/contraction-resultant image can be determined by referring to the equation (19).

The equation (19) is simplified into the following equations (20), (21), (22), and (23) when the number "n" equals "0", "1", "2", and "3" respectively.

$$\begin{aligned}
Ds4j &= F(Aijm0) \quad (20)\\
&= Sij + (\delta m0 + \delta m1)(Si-1j \cdot Sij-1) +\\
&\quad (\delta m2 + \delta m3)(Si+1j \cdot Sij-1)
\end{aligned}$$

$$\begin{aligned}
Ds4j+1 &= F(Aijm1) \quad (21)\\
&= Sij + \delta m0(Si-1j \cdot Sij-1) +\\
&\quad \delta m3(Si+1j \cdot Sij-1)
\end{aligned}$$

$$\begin{aligned}
Ds4j+2 &= F(Aijm2) \quad (22)\\
&= Sij + \delta m0(Si-1j \cdot Sij+1) +\\
&\quad \delta m3(Si+1j \cdot Sij+1)
\end{aligned}$$

$$\begin{aligned}
Ds4j+3 &= F(Aijm3) \quad (23)\\
&= Sij + (\delta m0 + \delta m1)(Si-1j \cdot Sij+1) +\\
&\quad (\delta m2 + \delta m3)(Si+1j \cdot Sij+1)
\end{aligned}$$

Thus, the data of the pixels Ds4j, Ds4j+1, Ds4j+2, and Ds4j+3 of the enlargement/contraction-resultant image can be simultaneously generated from the original-image pixel data Sij, Si−1j, Sij−1, Si+1j, and Sij+1 by executing the calculations of the equations (20), (21), (22), and (23) in parallel or simultaneously.

The parallel calculations of the equations (20), (21), (22), and (23) can be executed by separate logic circuits respectively. The amount of physical elements of the logic circuits can be reduced in view of the following facts. The calculations of the equations (20), (21), (22), and (23) are different from each other according to the value "m". When m=0 or m=1, the calculations refer to the pixel data Sij, Si−1j, Sij−1, and Sij+1 but do not refer to the pixel data Si+1j. When m=2 or m=3, the calculations refer to the pixel data Sij, Sij−1, Si+1j, Sij+1 but do not refer to the pixel data Si−1j. Simple versions of the logic circuits for executing the parallel calculations of the equations (20), (21), (22), and (23) are equal to the quadruple interpolation enlarging modules 20, 21, 22, and 23 of FIGS. 2 and 3.

In the case where the area of the original image is enlarged or contracted by a quadruple in the X-axis direction and by Q times in the Y-axis direction, the quadruple interpolation enlarging modules 20, 21, 22, and 23 of FIGS. 2 and 3 generate the data of the pixels Ds4j, Ds4j+1, Ds4j+2, and Ds4j+3 of the enlargement/contraction-resultant image as follows. The numbers "i" and "m" which denote the row of the original-image sub area Aijmn are calculated from the row number "s" related to the enlargement/contraction-resultant image and the magnification Q in the Y-axis direction according to the equation (17). When m=0 or m=1, the original-image pixel data Sij−1, Si−1j, Sij, and Sij+1 are respectively applied to the input terminals L-REF, TB-REF, M-REF, and R-REF of the quadruple interpolation enlarging modules as reference data. When m=2 or m=3, the original-image pixel data Sij−1, Si+1j, Sij, and Sij+1 are respectively applied to the input terminals L-REF, TB-REF, M-REF, and R-REF of the quadruple interpolation enlarging modules as reference data. In addition, an operation control signal is applied to the input terminal ROW03 of the quadruple interpolation enlarging modules. Thereby, the quadruple interpolation enlarging modules execute calculations in parallel (simultaneously) which are equivalent to the calculations of the equations (20), (21), (22), and (23). As a result, the quadruple interpolation enlarging modules output the process-resultant image pixel data Ds4j, Ds4j+1, Ds4j+2, and Ds4j+3 via the output terminals X4DATA0, X4DATA1, X4DATA2, and X4DATA3 thereof. The previously-mentioned control signal ROW03 is generated by inverting the result of Exclusive-OR operation between the bits of the 2-bit signal "m". It should be noted that, in fact, the calculation of the numbers "i" and "m" is executed by the sub-area row calculation unit 10 (see FIG. 1), and that the application of the reference data to the quadruple interpolation enlarging modules 20, 21, 22, and 23 is executed by the reference data selector 13 (see FIG. 1). The quadruple interpolation enlarging unit 14 of FIGS. 1 and 2 generates data of 16 successive pixels in a same row of an enlargement-resultant image from the reference data of 10 pixels of the original image. During the generation of the data of the 16 process-resultant image pixels, the quadruple interpolation enlarging modules 20, 21, 22, and 23 execute calculating processes in parallel (simultaneously). As shown in FIG. 2, the input terminals of the quadruple interpolation enlarging modules 20, 21, 22, and 23 which receive the same data are connected in common, and the calculating operations of the quadruple interpolation enlarging modules 20, 21, 22, and 23 are controlled by the same control signal ROW03.

Figure 10:
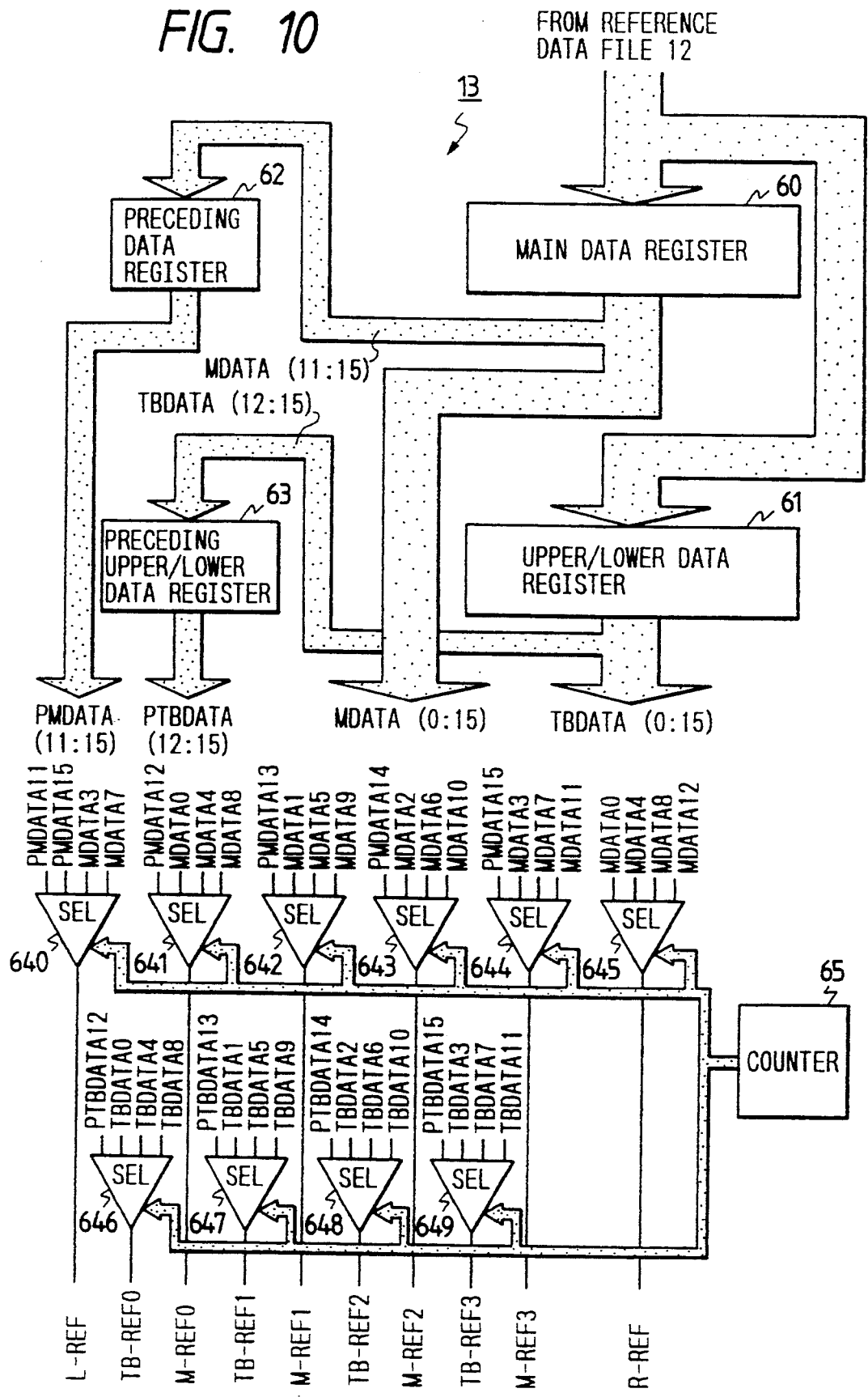
FIG. 10 is a block diagram of a reference data selector in FIG. 1.

The reference data selector 13 will now be described in detail. As shown in FIG. 10, the reference data selector 13 includes a 16-bit main reference data register 60, a 16-bit upper/lower reference data register 61, a 5-bit preceding main reference data register 62, a 4-bit preceding upper/lower reference data register 63, selectors 640–649 of the 4-bit input and 1-bit output type, and a 2-bit counter 65. The input terminals of the reference data registers 60 and 61 are connected to the reference data file 12 (see FIG. 1). The input terminals of the preceding reference data registers 62 and 63 are connected to the output terminals of the reference data registers 60 and 61. The reference data registers 60, 61, 62, and 63 are followed by the selectors 640–649. Control terminals of the selectors 640–649 are connected to an output terminal of the counter 65.

Figure 11:
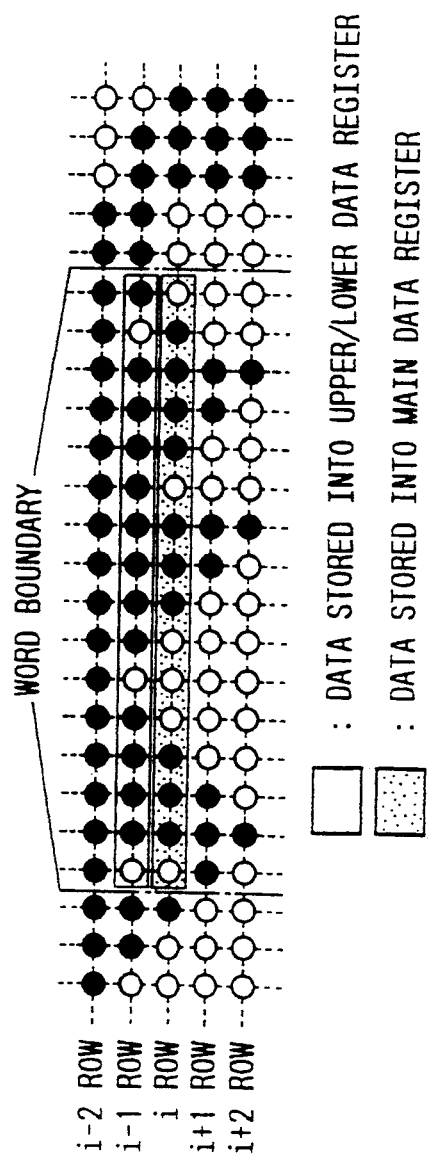
FIG. 11 is a diagram of an array of data of pixels in the image enlarging/contracting apparatus of FIG. 1.
Figure 12:
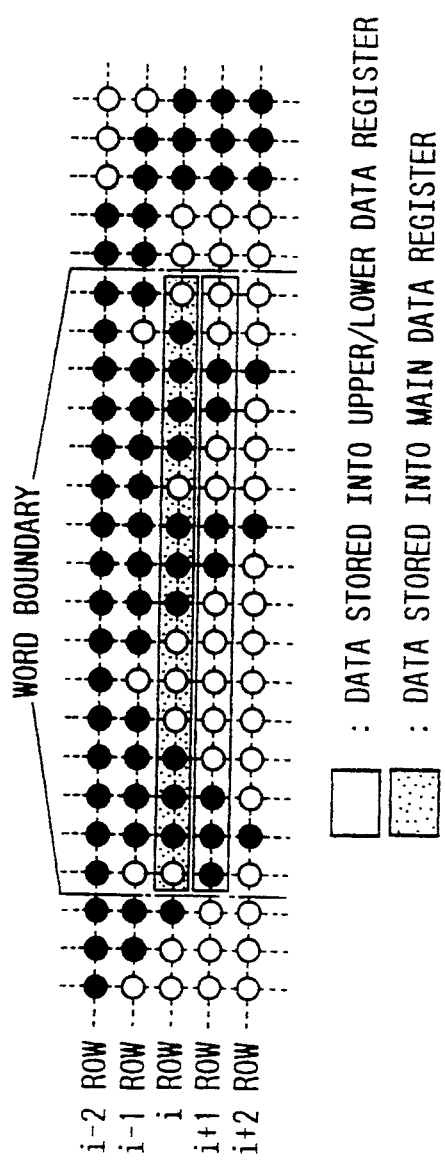
FIG. 12 is a diagram of an array of data of pixels in the image enlarging/contracting apparatus of FIG. 1.

As shown in FIGS. 11 and 12, in the case where the quadruple interpolation enlarging unit 14 generates data of pixels in an s-th row of an enlargement/contraction-resultant image, word data of pixels in an i-th row of an original image is stored into the main reference data register 60 while word data of pixels neighboring the upper or lower side of the pixels related to the word data in the main reference data register 60 is stored into the upper/lower reference data register 61 according to a value "m" (the number "i" meets the requirements given by the equation (17)). Specifically, as shown in FIG. 11, when m=0 or m=1, word data of pixels in the (i−1)-th row of the original image is stored into the upper/lower reference data register 61. As shown in FIG. 12, when m=2 or m=3, word data of pixels in the (i+1)-th row of the original image is stored into the upper/lower reference data register 61. Data of 5 successive pixels neighboring the left side of the pixels related to the word data in the main reference data register 60 is stored into the preceding main reference data register 62. Data of 4 successive pixels neighboring the left side of the pixels related to the word data in the upper/lower reference data register 61 is stored into the preceding upper/lower reference data register 63. As will be made clear later, the reference data selector 13 is designed so that data of a set of pixels which extends across the boundary between words on the source-image memory 850 (see FIG. 1) can be simultaneously referred to.

The counter 65 executes a count-up process in response to a clock pulse each time the quadruple interpolation enlarging unit 14 generates interpolation-resultant data. The selectors 640–649 selects 10-bit data from among the data in the reference data registers 60, 61, 62, and 63 in accordance with the state of a 2-bit selection control signal which is generated by the counter 65 and which represents the value SELECT(0:1) counted by the counter 65. The relation among modes of the selection, the count values SELECT(0;1), and the selected data is indicated in FIG. 13.

The data of a set of pixels which extends across the word boundary is referred to in the case of the selection mode "0" or the selection mode "3". When the value SELECT(0:1) counted by the counter 65 reaches "3", data MDATA(11:15) of the 11-th to 15-th bits of the main reference data register 60 are transferred to the preceding main reference data register 62 and data TBDATA(12:15) of the 12-th to the 15-th bits of the upper/lower reference data register 61 are transferred to the preceding upper/lower reference data register 63. In addition, data of next words are transferred to the main reference data register 60 and the upper/lower reference data register 61 from the reference data file 12 (see FIG. 1). At this time, since the selection mode "3" occurs, the data PMDATA(11:15) in the preceding main reference register 62 and the data MDATA0 in the 0-th bit of the main reference data register 60 are selected as main reference data. Thus, the data of a set of pixels which extends across the word boundary is selected as reference data. In the case where SELECT(0:1)=0, the data PMDATA15 in the 15-th bit of the preceding main reference register 62 and the data MDATA(0:4) in the 0-th to the 4-th bits of the main reference register 60 are selected as main reference data. Thus, the data of a set of pixels which extends across the word boundary is selected as reference data. The counter 65 serves to change the data transfer between the registers and the selected bit field in this way, and thereby it is made possible to simultaneously refer to the data of a set of pixels which extends across the word boundary. In addition, it is possible to continuously change the data which the quadruple interpolation enlarging unit 14 refers to.

Figure 14:
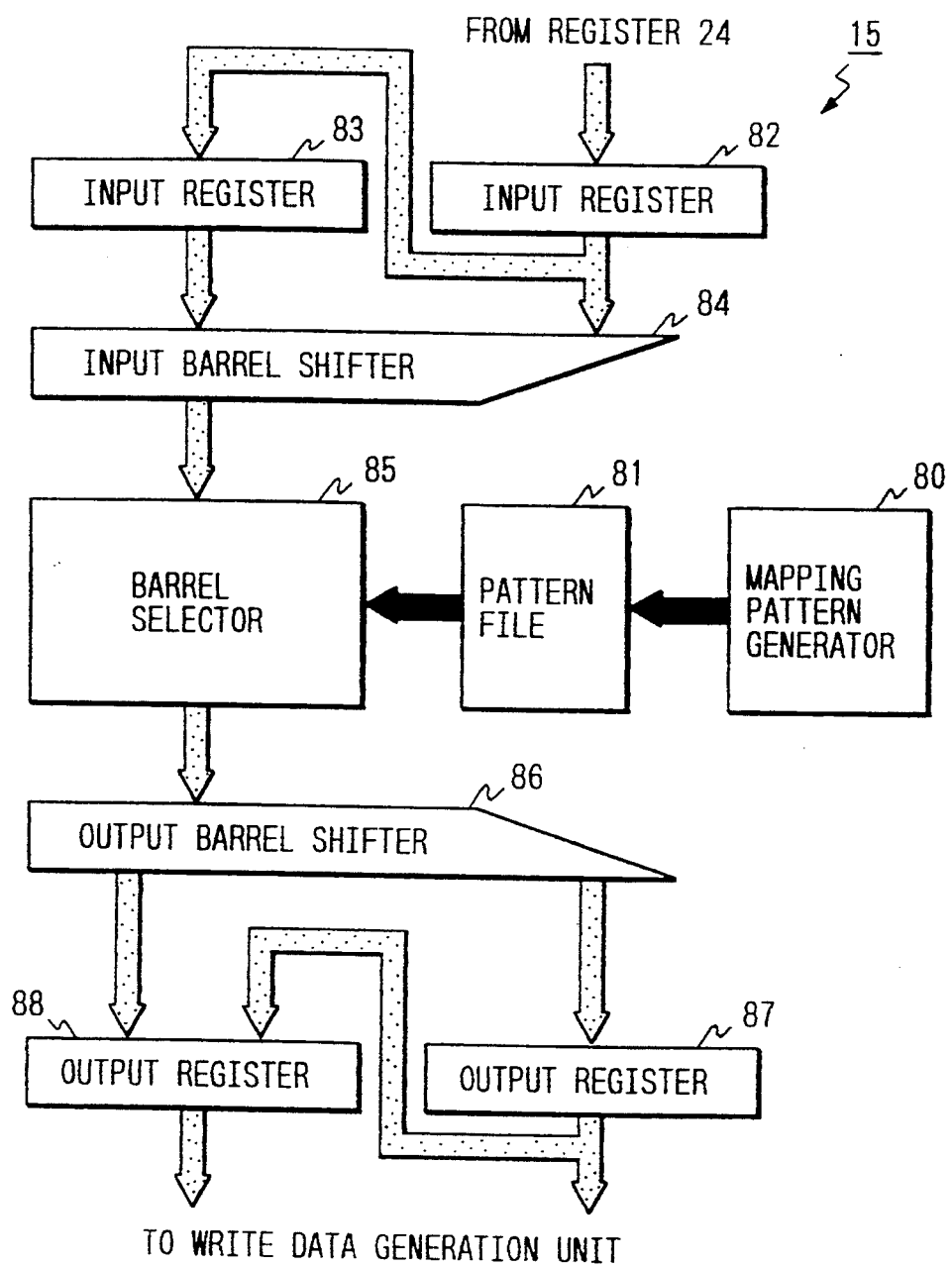
FIG. 14 is a block diagram of an X-direction enlarging/contracting unit in FIG. 1.

The X-direction enlarging/contracting unit 15 will now be described in detail. As shown in FIG. 14, the X-direction enlarging/contracting unit 15 includes a mapping pattern generator 80, a pattern register file 81, input data registers 82 and 83, an input barrel shifter 84, a barrel selector 85, an output barrel shifter 86, and output data registers 87 and 88. The mapping pattern generator 80 serves to produce a 16-word mapping pattern which is stored into the pattern register file 81. The input data register 82 follows the register 24 in the quadruple interpolation enlarging unit 14 (see FIG. 2), and serves to store 1-word data. The input data register 83 follows the input data register 82, and serves to store 1-word data. The input data registers 82 and 83 are successively followed by the input barrel shifter 84 and the barrel selector 85. The input barrel shifter 84 functions to shift input data leftward bit by bit from 0 to 15 bits. The barrel selector 85 is connected to the pattern register file 81. The barrel selector 85 serves to expand or compress input data by a copying process or a thinning-out process which is executed in accordance with the mapping pattern fed from the pattern resister file 81. The output barrel shifter 86 follows the barrel selector 85. The output barrel shifter 86 functions to shift input data rightward bit by bit from 0 to 15 bits. The output data registers 87 and 88 follow the output barrel shifter 86. The output data registers 87 and 88 serve to store 1-word data each. The output data registers 87 and 88 are followed by the write data generation unit 17 (see FIG. 1).

The mapping pattern is a pattern composed of binary data which is used for mapping pixel data in accordance with the magnification (that is, the enlargement/contraction rate). The mapping pattern is previously produced by the mapping pattern generator 80, and is stored in the pattern register file 81 word by word. The mapping pattern is inputted into the barrel selector 85 word by word as a control signal, and input data of successive pixels in the X-axis direction are processed in accordance with the mapping pattern. The X-direction enlarging/contracting unit 15 executes same processing on input data for every row, and processing on a next row uses the same mapping pattern in the pattern register file 81.

Figure 15:
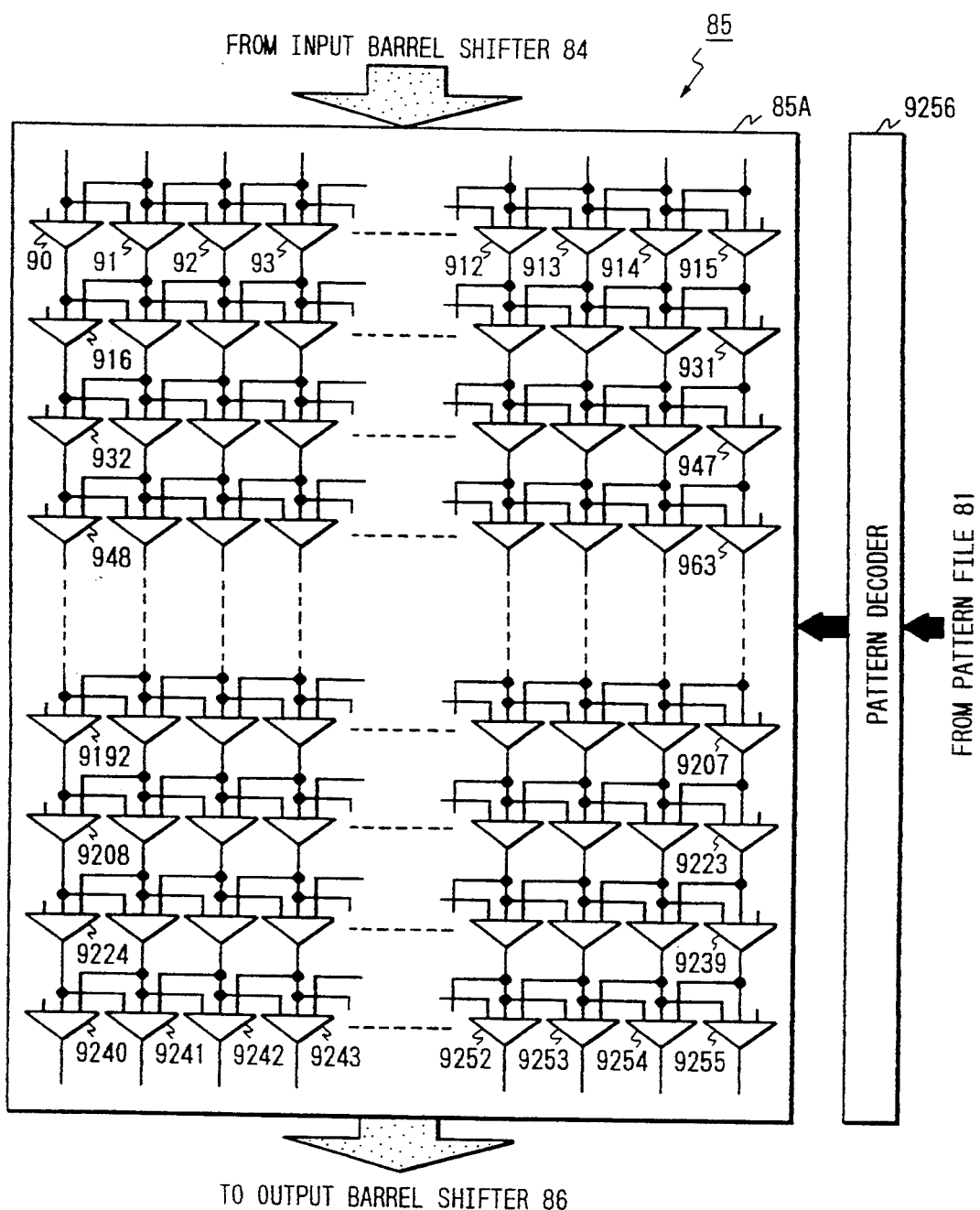
FIG. 15 is a block diagram of a barrel selector in FIG. 14.

As shown in FIG. 15, the barrel selector 85 includes an array 85A of 256 selectors 90–9255 of a 3-input and 1-output type, and a pattern decoder 9256. The selector array 85A is connected between the input barrel shifter 84 and the output barrel shifter 86 (see FIG. 14). The selector array 85A is also connected to the pattern decoder 9256. The pattern decoder 9256 is connected to the pattern register file 81 (see FIG. 14). The pattern decoder 9256 generates control signals on the basis of the mapping pattern informed by the pattern register file 81. The selector array 85A has 16 rows and 16 columns. Each of the selectors 90–9255 serves to select one of three pieces (three bits) of input data in accordance with a control signal fed from the pattern decoder 9256.

In the case where P/4<1 so that the X-direction enlarging/contracting unit 15 executes a contracting process, the selector array 85A thins out 16-bit input data into [4P]-bit or ([4P]+1)-bit data in response to control signals fed from the pattern decoder 9256. Here, the character [4P] denotes the largest integer not greater than the value 4P. The selector array 85A outputs the [4P]-bit or ([4P]+1)-bit data. The input mapping pattern determines which of the [4P]-bit data and the ([4P]+1)-bit data should be outputted.

In the case where $1 \leq P/4$ so that the X-direction enlarging/contracting unit 15 executes an enlarging process, the selector array 85A copies a portion of [64/P]-bit or ([64/P]+1)-bit input data in response to control signals fed from the pattern decoder 9256, and thereby expands the input data into 16-bit data. Here, the character [64/P] denotes the largest integer not greater than the value 64/P, and the number ([64/P]+1) is not greater than 16. The selector array 85A outputs the 16-bit data. The input mapping pattern determines which of the [64/P]-bit data and the ([64/P+1)-bit data should be used as input data.

It should be noted that the algorithm of the parallel (simultaneous) enlarging/contracting process executed by the barrel selector 85 is well-known in the art.

It is necessary that data inputted into the barrel selector 85 is equal to data of pixels successively arranged in the X-axis direction at positions starting from the left-hand edge. The input data registers 82 and 83, and the input barrel shifter 84 cooperate to feed input data of such a format to the barrel selector 85.

In the case where P/4<1, the barrel selector 85 receives 16-bit data. Each time the barrel selector 85 generates data, data is transferred from the input data register 82 to the input data register 83 while data is transferred from the register 24 of the quadruple interpolation enlarging unit 14 (see FIG. 2) to the input data register 82. In addition, the input barrel shifter 84 receives data from the input data registers 82 and 83, and shifts the received data leftward by given bits to enable a set of the data positions to start from the left-hand edge.

In the case where 1<P/4, the barrel selector 85 receives [64/P]-bit or ([64/P]+1)-bit data, and thus the number of bits of the received data is always equal to or smaller than 16. Thus, until the processing of all data in the input data register 83 is completed, the transfer of data from the input data register 82 to the input data register 83 remains suspended. Each time the processing of all data in the input data register 83 is completed, data is transferred from the input data register 82 to the input data register 83 while data is transferred from the register 24 of the quadruple interpolation enlarging unit 14 (see FIG. 2) to the input data register 82. In this case, the amount of the data shift by the input barrel shifter 84 corresponds to a value which results from accumulatively adding the bit numbers of the input data processed by the barrel selector 85. It should be noted that, in this accumulative addition, 16 is subtracted from the addition result each time the addition result exceeds 16. Thus, until the processing of all data in the input data register 83 is completed, the bit numbers continue to be accumulatively added. When the processing of all data in the input data register 83 is completed (at this time, the addition result exceeds 16), data is transferred from the input data register 82 to the input data register 83 while data is transferred from the register 24 of the quadruple interpolation enlarging unit 14 (see FIG. 2) to the input data register 82. In addition, the amount of the data shift by the input barrel shifter 84 is made equal to the accumulative addition result minus 16. Thereby, the barrel selector 85 receives unprocessed data of pixels successively arranged in the X-axis direction at positions starting from the left-hand edge.

The output data from the barrel selector 85 is shifted rightward by the output barrel shifter 86 so that the data positions will be accorded with bit positions of a write destination word. The shifted data outputted from the output barrel shifter 86 is stored into the output registers 87 and 88. When data in the output register 88 becomes word data to be written into a write destination, the data is transferred from the output register 88 to the write data generation unit 17 (see FIG. 1) and data is transferred from the output register 87 to the output register 88.

In the case where $1 \leq P/4$, the barrel selector 85 always outputs 16-bit data. Thus, in this case, each time the barrel selector 85 generates data, the transfer of data from the output register 88 to the write data generation unit 17 (see FIG. 1) and also the transfer of data from the output register 87 to the output register 88 are executed.

In the case where 1>P/4, the barrel selector 85 generates [4P]-bit or ([4P]+1)-bit data, and thus the number of bits of the data generated by the barrel selector 85 is always equal to or smaller than 16. Thus, data stored into the output register 88 is not always equal to word data to be written into a write destination. Accordingly, the transfer of data from the output register 88 to the write data generation unit 17 (see FIG. 1) and also the transfer of data from the output register 87 to the output register 88 are executed each time data in the output register 88 becomes equal to word data to be written into a write destination.

Figure 16:
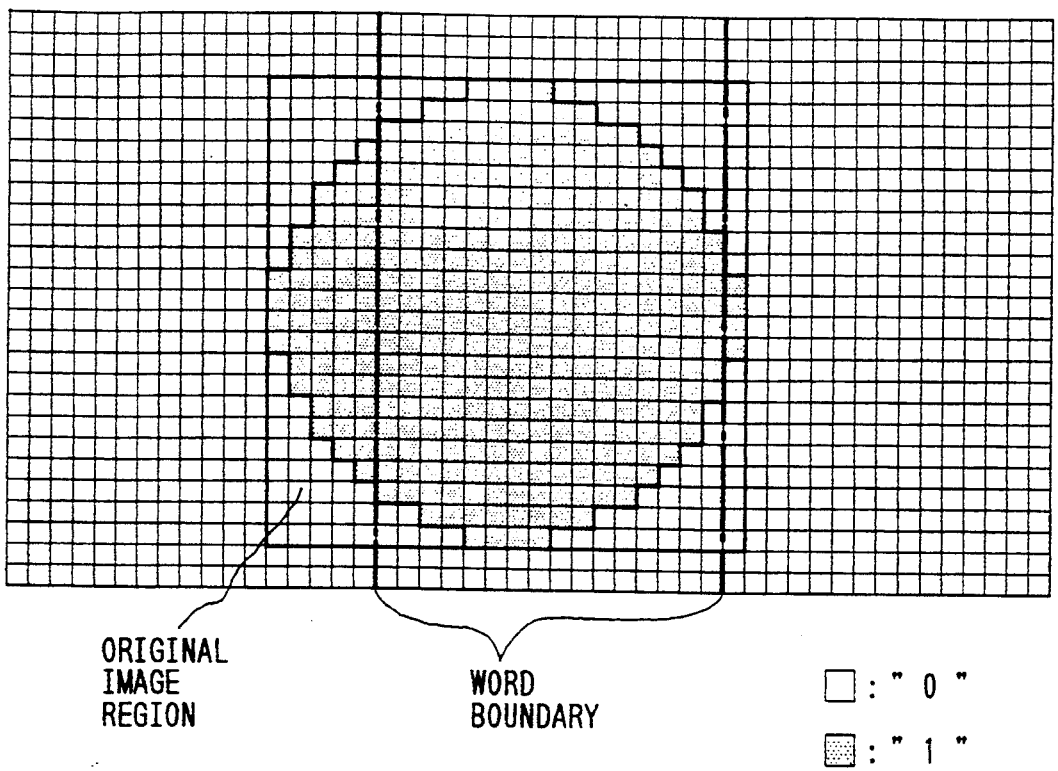
FIGS. 16 and 17 are diagrams of an array of data of pixels composing an example of an original image, the pixel data array being in a memory in the image enlarging/contracting apparatus of FIG. 1.
Figure 17:
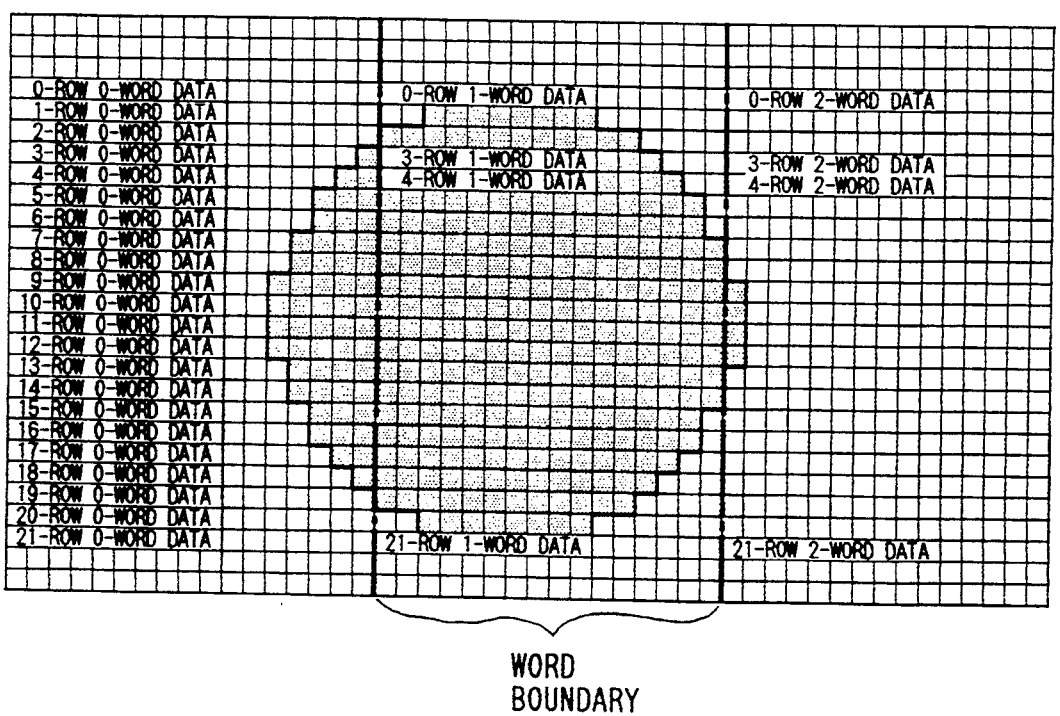

A detailed description will now be given of operation of the image enlarging/contracting apparatus which occurs in the case where an original image is enlarged double in an X-axis direction and also double in a Y-axis direction. FIG. 16 shows an example of an original image. As shown in FIG. 16, original-image pixel data are stored in storage segments of the source-image memory 850 which lie in a region extending across word boundaries. As shown in FIG. 17, a piece of word data in the source-image memory is identified by a row number and a word number as, for example, 0-row 2-word data.

In the case where an original image is enlarged double in the X-axis direction and also double in the Y-axis direction, when data of pixels in an 8-th row of a process-resultant image is required to be generated, the sub-area row calculation unit 10 (see FIG. 1) calculates a row number of a corresponding original-image sub area according to the equation (17). The calculated row number is defined as i=4 and m=0. The reference data address generating unit 11 produces an address on the basis of information of i=4 in the calculated row number, the produced address corresponding to 4-row 0-word data which will be main reference data. In addition, the reference data address generating unit 11 produces an address on the basis of information of m=0 in the calculated row number, the produced address corresponding to 3-row 0-word data which will be upper-/lower reference data. Data is read out from storage segments of the source-image memory 850 which are designated by the produced addresses, and the readout data is stored into the reference data file 12 (see FIG. 1). The 4-row 0-word data is transferred from the reference data file 12 to the main reference data register 60 of the reference data selector 13, and the 3-row 0-word data is transferred from the reference data file 12 to the upper-/lower reference data register 61 of the reference data selector 13 (see FIG. 10). Data of "2" is set in the counter 65 of the reference selector 13 (see FIG. 10), and 6-bit data MDATA(7:12) in the main reference register 60 and 4-bit TBDATA(8:11) in the upper-/lower reference data register 61 are selected as 10-bit reference data. The selected 10-bit reference data is subjected by the quadruple interpolation enlarging modules 20, 21, 22, and 23 of the quadruple interpolation enlarging unit 14 (see FIGS. 1 and 2) to the calculations determined by the equation (19) for m=0, so that the 10-bit data is interpolated and converted into 16-bit data. The 16-bit data generated by the quadruple interpolation enlarging unit 14 corresponds to data representing an image which results from enlarging the original image quadruple in the X-axis direction and double in the Y-axis direction. The 16-bit data is transferred from the quadruple interpolation enlarging unit 14 to the input register 83 of the X-direction enlarging/contracting unit 15 (see FIGS. 1 and 14). The X-direction enlarging/contracting unit 15 processes the 16-bit data into data which corresponds to data resulting from contracting an image, represented by pieces of the input 16-bit data, by a factor of $\frac{1}{2}$(2/4). Thus, the X-direction enlarging/contracting unit 15 generates data (first process-resultant data) representing an image which results from enlarging the original image double in the X-axis direction and also double in the Y-axis direction. The X-direction enlarging/contracting unit 15 outputs the first process-resultant data to the write data generation unit 17 (see FIG. 1). The write data address generation unit 16 (see FIG. 1) previously generates an addresses of a 1-word storage segment of the object-image memory 860 into which process-resultant data will be written. The write data address generation unit 16 outputs the generated address to the object-image memory 860, so that word data is read out from the 1-word storage segment of the object-image memory 860 which is designated by the address. The readout word data is fed to the write data generation unit 17. As described previously, the write data generation unit 17 receives the first process-resultant data from the X-direction enlarging-/contracting unit 15. The write data generation unit 17 executes logic operation and masking operation between the word data and the first process-resultant data, thereby converting the first process-resultant data into second process-resultant data. The write data generation unit 17 outputs the second process-resultant data to the object-image memory 860. While the write data address generation unit 16 outputs the generated address to the object-image memory 860, the second process-resultant data is written into the 1-word storage segment of the object-image memory 860 which is designated by the address.

During the above-mentioned sequential operation, the devices 10-17 execute their processing functions in parallel to each other, that is, execute their processing functions simultaneously. In time domain, the operations of the devices 10-17 are executed as follows. When the 4-row 0-word data and the 3-row 0-word data are transferred from the reference data file 12 to the main reference data register 60 and the upper/lower reference data register 61 of the reference data selector 13 respectively, the reference data address generation unit 11 produces an address designating 4-row 1-word data as main reference data and also produces an address designating 3-row 1-word data as upper/lower reference data. The produced addresses are applied to the source-image memory 850 so that the 4-row 1-word data and the 3-row 1-word data are transferred from the source-image memory 850 to the reference data file 12.

When the quadruple interpolation enlarging unit 14 generates the data representing the image which results from enlarging the original image quadruple in the X-axis direction and double in the Y-axis direction, the counter 65 executes a count-up process in response to a clock pulse so that the value SELECT(0:1) increases to "3". Then, the data MDATA(11:15) is transferred from the main reference data register 60 to the preceding main reference data register 62, and the data TBDATA(12:15) is transferred from the upper/lower reference data register 61 to the preceding upper/lower reference data register 63. In addition, the 4-row 1-word data and the 3-row 1-word data are transferred from the reference data file 12 to the main reference data register 60 and the upper/lower reference data selector 61 respectively. The data MDATA0 in the main reference data register 60, the data PMDA- TA(11:15) in the preceding main reference data register 62, and the PTBDATA(12:15) in the preceding upper-/lower reference data register 63 are selected as reference data. Furthermore, the reference data address generation unit 11 produces an address designating 4-row 2-word data as main reference data and also produces an address designating 3-row 2-word data as upper/lower reference data. The produced addresses are applied to the source-image memory 850 so that the 4-row 2-word data and the 3-row 2-word data are transferred from the source-image memory 850 to the reference data file 12.

When the X-direction enlarging/contracting unit 15 generates the data representing the image which results from enlarging the original image double in the X-axis direction and also double in the Y-axis direction so that the data transfer to the input data register 82 in the X-direction enlarging/contracting unit 15 becomes permitted, the quadruple interpolation enlarging unit 14 feeds the input register 82 with the data representing the image which results from enlarging the original image quadruple in the X-axis direction and double in the Y-axis direction. In addition, the value SELECT(0:1) counted by the counter 65 is reset to "0", and the data MDATA(0:4) in the main reference data register 60, the data PMDATA15 in the preceding main reference data register 62, and the data TBDATA(0:3) in the upper-/lower reference data register 61 are selected as reference data.

In this way, each of the devices 10-17 transfers processed data to a subsequent device immediately after the processing by the subsequent device is completed. In addition, each of the devices 10-17 receives the data, which is processed by a preceding device, from the preceding device, and subjects the received data to related processing. The operations of the devices 10-17, and the data transfer among the devices 10-17 are controlled by the controller 18.

FIG. 29 shows an example of the controller 18. As shown in FIG. 29, the controller 18 includes a combination of an AND logic array 18E and an OR logic array 18F. The OR logic array 18F has a set of address lines and a set of data lines. The address lines of the OR logic array 18F are connected to the AND logic array 18E. The OR logic array 18F has segments 18A, 18B, 18C, and 18D. The OR logic array segment 18A stores data of control of first one of the devices 10-17. In the OR logic array segment 18A, there are pieces of control data corresponding to the address lines extending therein respectively. The OR logic array segment 18B stores data of control of second one of the devices 10-17. In the OR logic array segment 18B, there are pieces of control data corresponding to the address lines extending therein respectively. The OR logic array segment 18C stores data for designating an address line of the OR logic array segment 18A which will be selected next. The OR logic array segment 18D stores data for designating an address line of the OR logic array segment 18B which will be selected next. The OR logic array segments 18A and 18C have common address lines. The OR logic array segments 18B and 18D have common address lines. The OR logic array segments 18A and 18B have a given number of common data lines which correspond to control signals fed in common to first one and second one of the devices 10-17. In addition, the OR logic array segment 18A has exclusive data lines corresponding to control signals fed to only first one of the devices 10-17, and the OR logic array segment 18B has exclusive data lines corresponding to control signals fed to only second one of the devices 10-17. Data lines of the OR logic array segments 18C and 18D are connected to an input side of a selector 18P. An input signal (a flag signal outputted from the devices 10-17) is applied to the AND logic array 18E and the input side of the selector 18P. The selector 18P serves to select one of the input signal and a signal outputted from the OR logic array segments 18C and 18D, and stores the selected signal into a register 18Q. Then, the selected signal is fed from the register 18Q to the AND logic array 18E. The AND logic array 18E serves as a decoder which activates and selects at least two of the address lines of the OR logic array 18F in response to the input signal or the signal fed from the register 18Q.

The controller 18 of FIG. 29 operates as follows. When the input signal is fed to the AND logic array 18E, the AND logic array 18E activates and selects one of the address lines of the OR logic array segments 18A and 18C and one of the address lines of the OR logic array segments 18B and 18D in response to the input signal. Control data corresponding to the selected address line are outputted from the OR logic array segment 18A via the data lines, and data on the exclusive data lines are subjected to OR operation and are thus combined into a control signal fed to first one of the devices 10-17. Control data corresponding to the selected address line are outputted from the OR logic array segment 18B via the data lines, and data on the exclusive data lines are subjected to OR operation and are thus combined into a control signal fed to second one of the devices 10-17. In addition, data on the common data lines are subjected to OR operation and are thus combined into a control signal fed in common to first one and second one of the devices 10-17. At the same time, data corresponding to the selected address lines are outputted from the OR logic array segments 18C and 18D via the data lines and are fed to the selector 18P. Then, the data are transmitted to the AND logic array 18E via the selector 18P and the register 18Q. The AND logic array 18E activates and selects one of the address lines of the OR logic array segments 18A and 18C and one of the address lines of the OR logic array segments 18B and 18D in response to the received data, so that next control signals are generated.

FIG. 29 shows only a part of the controller 18. In fact, the controller 18 includes a combination of OR logic array segments similar to the combination of the OR logic array segments 18A and 18C for each of others of the devices 10-17. Thus, control signals to the devices 10-17 are generated simultaneously so that the devices 10-17 can simultaneously execute their processing functions.

Figure 18:
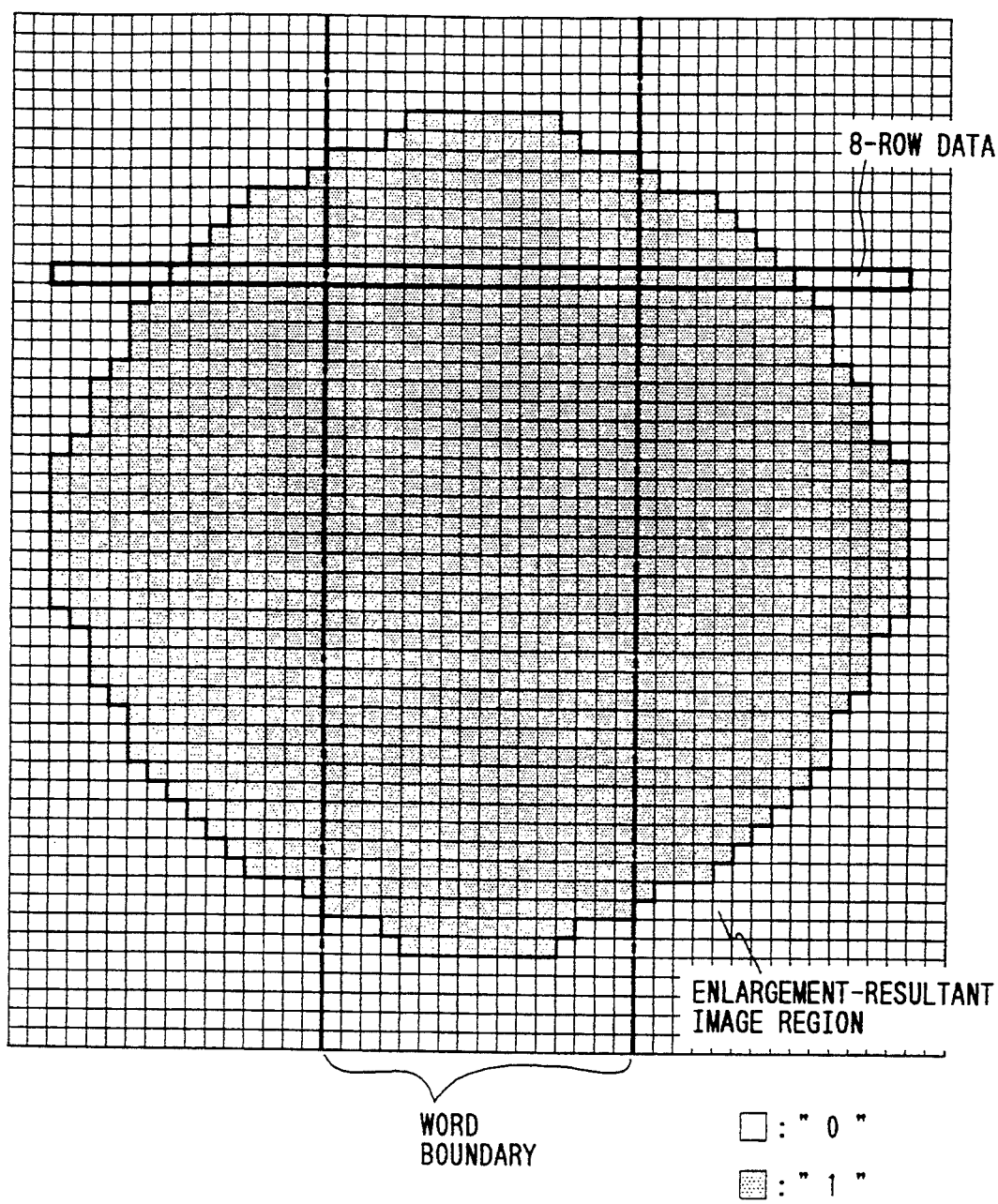
FIG. 18 is a diagram of an array of data of pixels composing an image enlarged from the original image of FIGS. 16 and 17 double in an X-axis direction and also double in a Y-axis direction with the execution of interpolation, the pixel data array being in a memory in the image enlarging/contracting apparatus of FIG. 1.
Figure 19:
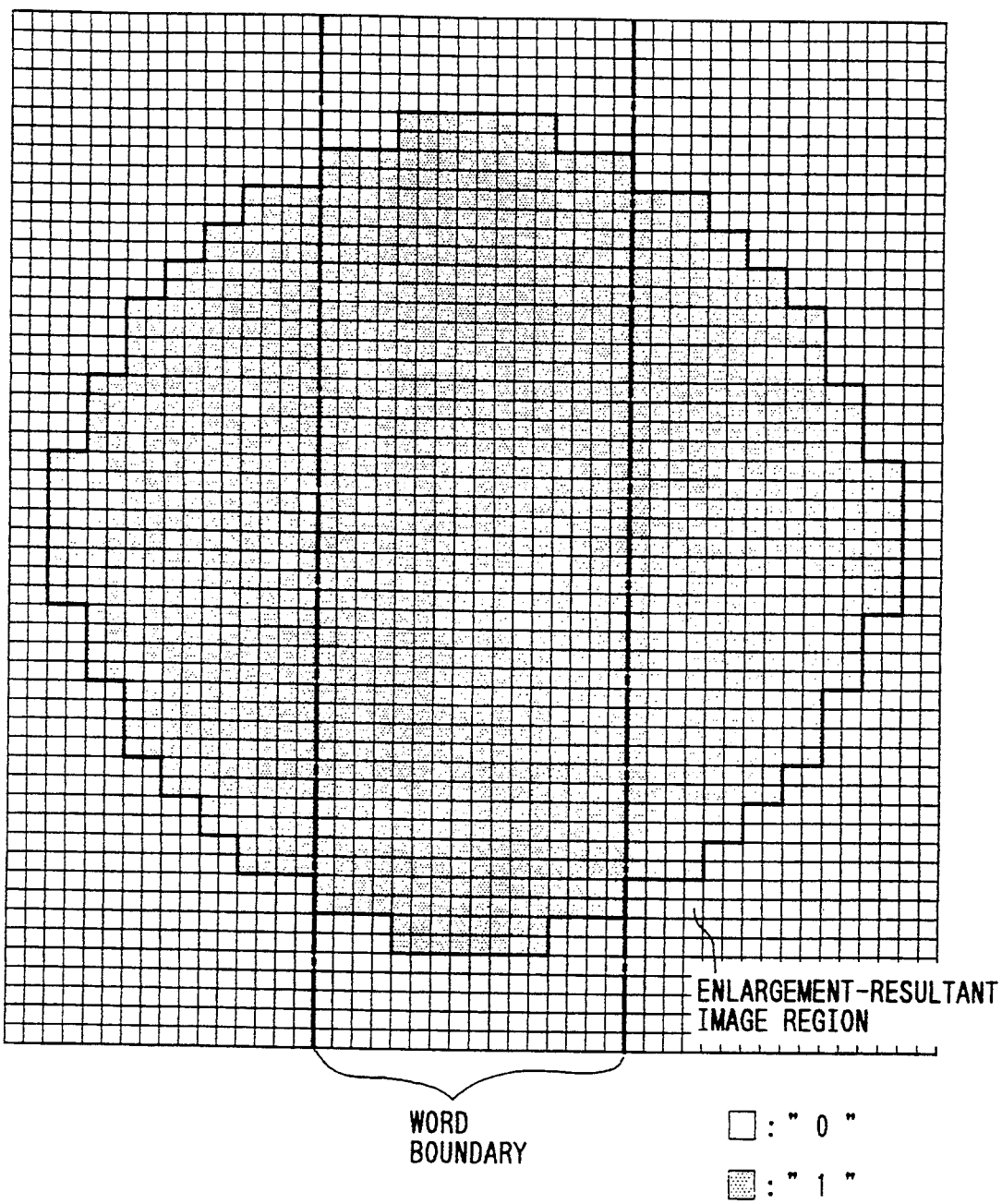
FIG. 19 is a diagram of an array of data of pixels composing an image enlarged from the original image of FIGS. 16 and 17 double in an X-axis direction and also double in a-Y-axis direction without the execution of interpolation, the pixel data array being in a memory.

FIG. 18 shows an image which results from enlarging the original image of FIG. 16 double in the X-axis direction and also double in the Y-axis direction with executing the interpolation by the image enlarging/contracting apparatus according to the embodiment of this invention. FIG. 19 shows an image which results from enlarging the original image of FIG. 16 double in the X-axis direction and also double in the Y-axis direction without executing the interpolation. It is understood from the comparison between FIG. 18 and FIG. 19 that the interpolation provides smoother inclined edges.

The time spent in a single calculation or a single transfer of data is defined as being equal to one machine cycle, that is, a unit processing time. In a prior art apparatus, an estimated total processing time spent in processing of original-image data to enlarge an original image double in the X-axis direction and also double in the Y-axis direction is equal to or greater than 8,000 machine cycles. In the image enlarging/contracting apparatus according to the embodiment of this invention, a corresponding estimated total processing time is equal to about 1,800 machine cycles.

It should be noted that the quadruple interpolation enlarging modules 20, 21, 22, and 23 of FIGS. 2 and 3 may also be made of a ROM (read only memory) storing data corresponding to the equations (20), (21), (22), and (23). In this case, data fed from the reference data selector 13 is applied to the ROM as an address, and interpolation data is outputted from the ROM.

The controller 18 may also be composed of a multi-process MPU (micro processing unit) which simultaneously execute a plurality of processes for controlling the devices 10-17.

DESCRIPTION OF THE SECOND PREFERRED EMBODIMENT

An image enlarging/contracting apparatus according to a second embodiment of this invention processes multi-level image data. Specifically, 24 bits of the image data corresponds to a pixel. The image enlarging/contracting apparatus includes image memories (a source-image memory and an object-image memory) which are designed so that access to the image memories can be performed word by word, where one word is composed of 24 bits.

Figure 20:
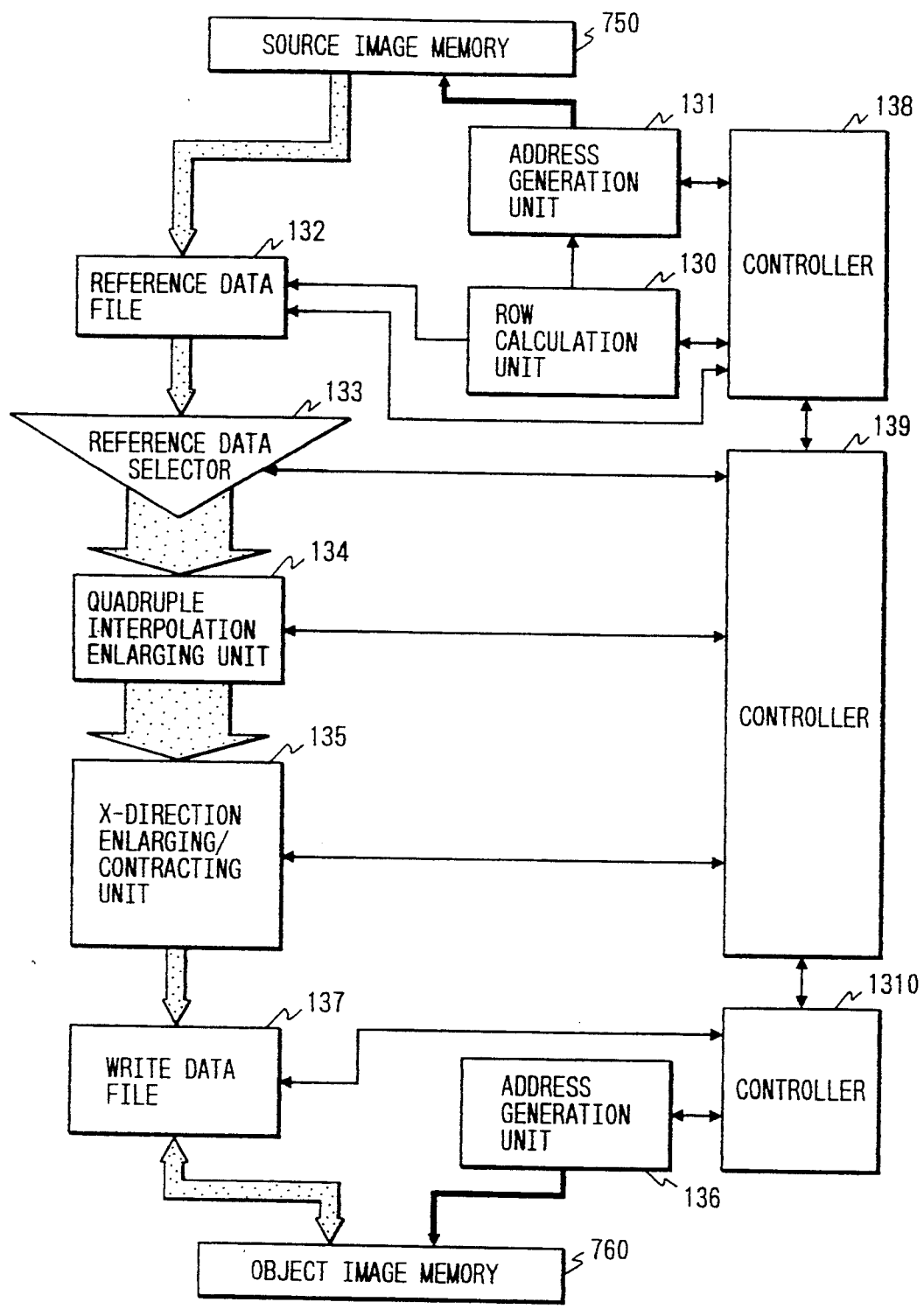
FIG. 20 is a block diagram of an image enlarging/contracting apparatus according to a second embodiment of this invention.

FIG. 20 shows the image enlarging/contracting apparatus which includes a sub-area row calculation unit 130, a reference data address generation unit 131, a reference data file 132, a reference data selector 133, a quadruple interpolation enlarging unit 134, an X-direction enlarging/contracting unit 135, a write data address generation unit 136, a write data file 137, and controllers 138, 139, and 1310.

The sub-area row calculation unit 130 is connected to the controller 138, the reference data address generation unit 131, and the reference data file 132. Each of areas among pixels of a whole original-image (source-image) region is divided into a set of small segments or sub areas. The sub-area row calculation unit 130 serves to calculate a row number of original-image sub areas corresponding to a row of pixels of a process-resultant (enlargement/contraction-resultant) image, that is, an object image. The reference data address generation unit 131 is connected to the sub-area row calculation unit 130, the controller 138, and a source-image memory 750. The source-image memory 750 stores data representing an original image, that is, a source image. The reference data address generation unit 131 serves to generate addresses of 1-word storage segments of the source-image memory 750 which store reference data representing a window of the original image. The reference data file 132 is connected to the sub-area row calculation unit 130, the reference data selector 133, the controller 138, and the source-image memory 750. The reference data file 132 serves to store the reference data (the original-image data in the window) which is read out from the source-image memory 750. The reference data file 132 also serves to store information of the sub-area row number calculated by the sub-area row calculation unit 130. The reference data selector 13 is connected to the reference data file 132, the quadruple interpolation enlarging unit 134, and the controller 139.

The reference data selector 133 serves to select one of pieces of the reference data which (the original-image data in the window) will be referred to by a quadruple interpolation enlarging process. The quadruple interpolation enlarging unit 134 is connected to the reference data selector 133, the X-direction enlarging/contracting unit 135, and the controller 139. The quadruple interpolation enlarging unit 134 serves to subject the reference data to an interpolation process of quadruple enlargement in an X-axis direction (a horizontal direction). The X-direction enlarging/contracting unit 135 is connected to the quadruple interpolation enlarging unit 134, the write data file 137, and the controller 139. The X-direction enlarging/contracting unit 135 serves to execute a process of enlargement and contraction with an arbitrary magnification in the X-axis direction without performing interpolation. The write data address generation unit 136 is connected to the controller 1310 and an object-image memory 760. The object-image memory 760 serves to store data representing a process-resultant (enlargement/contraction-resultant) image, that is, an object image. The write data address generation unit 136 serves to generate an updatable address of a 1-word storage segment of the object-image memory 760 into which process-resultant data will be written. The write data file 137 is connected to the X-direction enlarging/contracting unit 135, the controller 1310, and the object-image memory 760. The write data file 137 serves to store the process-resultant (enlargement/contraction-resultant) image data to be written into the object memory 760. The controller 138 is connected to the sub-area row calculation unit 130, the reference data address generation unit 131, the reference data file 132, and the controller 139. The controller 138 serves to control operation of the sub-area row calculation unit 130, the reference data address generation unit 131, and the reference data file 132. The controller 138 includes a suitable device such as a programmable logic array (PLA). The controller 139 is connected to the reference data selector 133, the quadruple interpolation enlarging unit 134, the X-direction enlarging/contracting unit 135, and the controllers 138 and 1310. The controller 139 serves to control operation of the reference data selector 133, the quadruple interpolation enlarging unit 134, and the X-direction enlarging/contracting unit 135. The controller 139 includes a suitable device such as a programmable logic array (PLA). The controller 1310 is connected to the write data address generation unit 136, the write data file 137, and the controller 139. The controller 1310 serves to control operation of the write data address generation unit 136 and the write data file 137. The controller 1310 includes a suitable device such as a programmable logic array (PLA).

It is preferable that the controllers 138, 139, and 1310 have structures similar to the structure of FIG. 29.

A description will now be given of the case where an original image is enlarged or contracted by P times in the X-axis direction and Q times in a Y-axis direction (a vertical direction) perpendicular to the X-axis direction. Letters P and Q denote arbitrary rational numbers. First, the sub-area row calculation unit 130 calculates a row number of original-image sub areas corresponding to a row of pixels of a process-resultant (enlargement/contraction-resultant) image, that is, an object image, on the basis of the magnification Q in the Y-axis direction. The sub-area row calculation unit 130 informs the reference data address generation unit 131 and the reference data file 132 of the calculated row number. The reference data address generation unit 131 generates addresses of two 1-word storage segments in two adjacent rows of the source-image memory 750 on the basis of the calculated row number. The reference data address generation unit 131 outputs the generated addresses to the source-image memory 750, so that two pieces of 1-word reference data (that is, 2-word reference data) are read out from the two 1-word storage segments of the source-image memory 750 which are designated by the addresses respectively. The 2-word readout data is stored into the reference data file 132. At this time, the information of the sub-area row number calculated by the sub-area row calculation unit 130 is stored into the reference data file 132 in correspondence with the reference data read out from the source-image memory 750. The 2-word reference data is transferred from the reference data file 132 to registers within the reference data selector 133. The reference data selector 133 feeds the reference data to the quadruple interpolation enlarging unit 134. At this time, the information of the sub-area row number corresponding to the reference data transferred from the reference data file 132 is simultaneously read out from the reference data file 132, and is then fed to the quadruple interpolation enlarging unit 134. The quadruple interpolation enlarging unit 134 subjects the reference data to a quadruple interpolation enlarging process according to the sub-area row number, thereby interpolating and converting the reference data into 8-word (8-pixel) data. The 8-word data generated by the quadruple interpolation enlarging unit 134 corresponds to data representing an image which is enlarged or contracted from the original image by a quadruple in the X-axis direction and Q times in the Y-axis direction. The quadruple interpolation enlarging unit 134 outputs the 8-word data to the X-direction enlarging/contracting unit 135. The X-direction enlarging/contracting unit 135 subjects the 8-word data to a process corresponding to enlargement or contraction by P/4 times in the X-axis direction, so that the 8-word data is converted into process-resultant data representing an image which is enlarged or contracted from the original image by P times in the X-axis direction and Q times in the Y-axis direction. The process-resultant data is transferred from the X-direction enlarging/contracting unit 135 to the write data file 137. The write data address generation unit 136 generates an address of a 1-word storage segment of the object-image memory 760 into which the process-resultant data will be written. The write data file 137 outputs the process-resultant data to the object-image memory 760. While the write data address generation unit 136 outputs the generated address to the object-image memory 760, the process-resultant data is written into the 1-word storage segment of the object-image memory 760 which is designated by the address. The above-mentioned operation is executed row by row in a manner such that data of pixels in a same row of the enlargement/contraction-resultant image can be continuously generated in the X-axis direction. In addition, the row-by-row processings are continuously executed in the Y-axis direction so that the enlarging/contracting process including the interpolation can be completed.

As described previously, the operations of the devices 130-137 are controlled by the controllers 138, 139, and 1310. Specifically, the controller 138 controls the sub-area row calculation unit 130, the reference data address generation unit 131, and the reference data file 132. The controller 139 controls the reference data selector 133, the quadruple interpolation enlarging unit 134, and the X-direction enlarging/contracting unit 135. The controller 1310 controls the write data address generation unit 136 and the write data file 137. During the control of the operations of the devices 130-137, the controllers 138, 139, and 1310 output control signals to the associated devices 130-137 while the devices 130-137 output responsive flag signals to the controllers 138, 139, and 1310. In addition, given members of the received flag signals are further transmitted from one controller to the other controllers. Thereby, the data transfer among the devices 130-137 is controlled. The transmission of control signals and flag signals between the controllers 138, 139, and 1310 and the devices 130-137 is designed so that the devices 130-137 can execute their processing functions in parallel to each other, that is, execute their processing functions simultaneously.

The quadruple interpolation enlarging unit 134 will now be described in detail. Regarding the interpolation processing executed by the quadruple interpolation enlarging unit 134, each of areas among pixels of a whole original-image region is divided into 16 sub areas (4 by 4 sub areas, that is, 4 sub areas in the X direction and 4 sub areas in the Y direction). The interpolation processing includes a step of determining interpolation equations of 16 different types for each sub area. In the interpolation equations, pieces of data of adjacent pixels are used as variables. The interpolation processing also includes a step of referring to the interpolation equations and executing interpolation calculation determined by an original-image sub area corresponding to a pixel of a process-resultant (enlargement/contraction-resultant) image. The execution of the interpolation calculation generates interpolation data.

Figure 21:
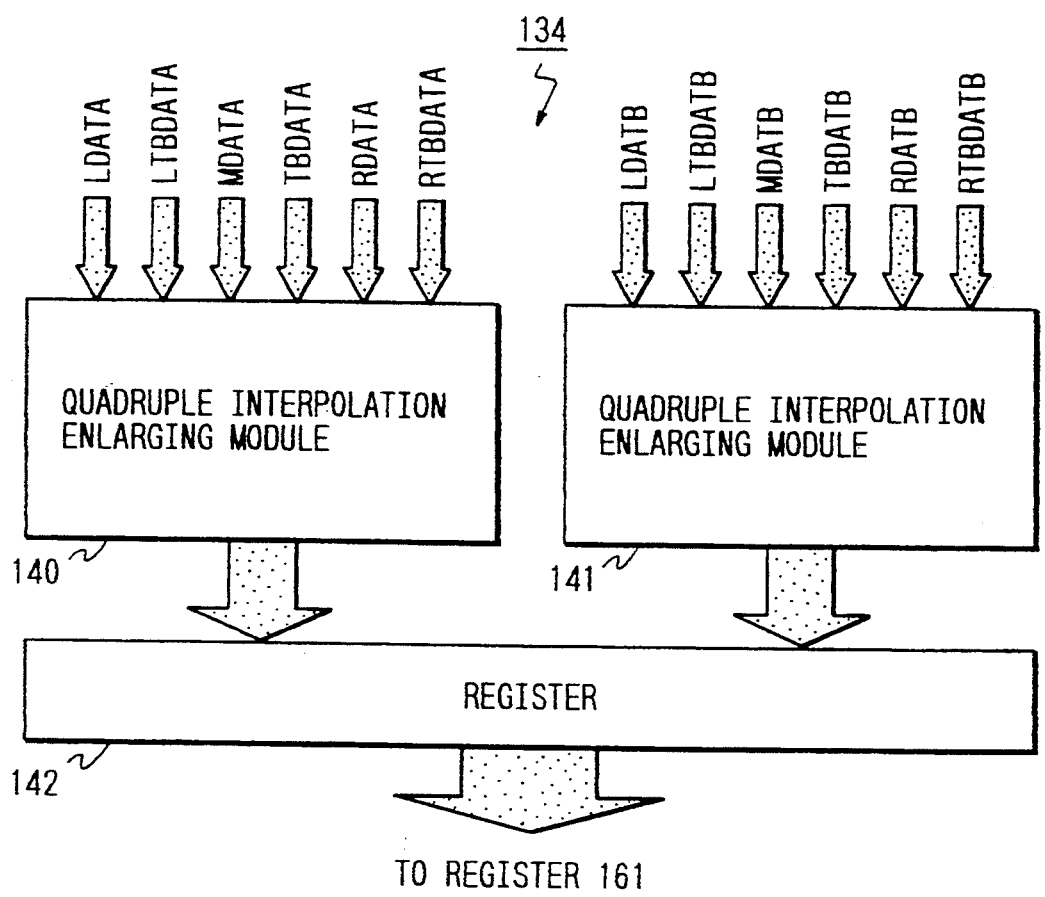
FIG. 21 is a block diagram of a quadruple interpolation enlarging unit in FIG. 20.

As shown in FIG. 21, the quadruple interpolation enlarging unit 134 includes quadruple interpolation enlarging modules 140 and 141, and a register 142. The quadruple interpolation enlarging modules 140 and 141 execute arithmetic operation among reference data bits LDATA, LTBDATA, MDATA, TBDATA, RDATA, RTBDATA, LDATB, LTBDATB MDATB, TBDATB, RDATB, and RTBDATB, thereby generating 8-word data which is stored into the register 142. The quadruple interpolation enlarging modules 140 and 141 have similar internal structures.

The operation of one quadruple interpolation enlarging module will now be described in detail. The interpolation processing executed by the quadruple interpolation enlarging module 140 or 141 is based on a well-known interpolation technique which uses distance-dependent weighting. Specifically, according to the interpolation processing executed by the quadruple interpolation enlarging module 140 or 141, a decision is given of a point within an original-image area which corresponds to a pixel of an enlargement/contraction-resultant (process-resultant) image, and data of the pixel is calculated from data of 4 original-image pixels adjacent to that point while the data of the 4 adjacent original-image pixels are weighted with the distances between the 4 pixels and that point. Specifically, each of areas among pixels of a whole original-image region is divided into 16 sub areas (4 by 4 sub areas, that is, 4 sub areas in the X direction and 4 sub areas in the Y direction). The interpolation processing includes a step of determining interpolation equations of 16 different types for each sub area. Interpolation calculation is determined by original-image sub areas corresponding to respective pixels of a quadruple-enlargement-resultant image, and the interpolation calculation is executed so that interpolation data is generated.

The operation of one quadruple interpolation enlarging module will be further described. With reference to FIG. 4, the character Sij denotes data of a pixel of an original image which exists at a position corresponding to an i-th row and a j-th column, and the position of the pixel coincides with a lattice point. The letters "i" and "j" denote integers equal to or greater than "0" respectively. As described previously, each of areas among pixels is divided into sub areas. Sixteen sub areas around the lattice point (the pixel position) so are denoted by Aijmn, where m=0, 1, 2, 3 and n=0, 1, 2, 3. The row of a sub area is represented by "i" and "m", and the column thereof is represented by "j" and "n".

Pieces F(Aijmn) of interpolation data are determined for sub areas Aijmn respectively, and are calculated from the data Sij of the pixel of interest and data Si−1j, Sij−1, Si+1j, Sij+1, Si−1j−1, Si−1j+1, Si+1j−1, and Si+1j+1 of pixels neighboring the pixel of interest according to interpolation equations (24)–(39) expressed as follows.

$$F(Aij00) = (Sij + Sij-1 + Si-1j + Si-1j-1)/4 \quad (24)$$

$$F(Aij10) = (4Sij + 2Sij-1 + Si-1j + Si-1j-1)/8 \quad (25)$$

$$F(Aij20) = (4Sij + 2Sij-1 + Si+1j + Si+1j-1)/8 \quad (26)$$

$$F(Aij30) = (Sij + Sij-1 + Si+1j + Si+1j-1)/4 \quad (27)$$

$$F(Aij01) = (4Sij + 2Si-1j + Sij-1 + Si-1j-1)/8 \quad (28)$$

$$F(Aij11) = Sij \quad (29)$$

$$F(Aij21) = Sij \quad (30)$$

$$F(Aij31) = (4Sij + 2Si+1j + Sij-1 + Si+1j-1)/8 \quad (31)$$

$$F(Aij02) = (4Sij + 2Si-1j + Sij+1 + Si-1j+1)/8 \quad (32)$$

$$F(Aij12) = Sij \quad (33)$$

$$F(Aij22) = Sij \quad (34)$$

$$F(Aij32) = (4Sij + 2Si+1j + Sij+1 + Si+1j+1)/8 \quad (35)$$

$$F(Aij03) = (Sij + Sij+1 + Si-1j + Si-1j+1)/4 \quad (36)$$

$$F(Aij13) = (4Sij + 2Sij+1 + Si-1j + Si-1j+1)/8 \quad (37)$$

$$F(Aij23) = (4Sij + 2Sij+1 + Si+1j + Si+1j+1)/8 \quad (38)$$

$$F(Aij33) = (Sij + Sij+1 + Si+1j + Si+1j+1)/4 \quad (39)$$

In the interpolation equations (24)–(39), the character "+" denotes addition between pixel data values, and the character "/" denotes division between pixel data values and coefficients.

A consideration will now be given of the case where the area of the original image is enlarged or contracted by a quadruple in the X-axis direction and by Q times in the Y-axis direction. The character Dst denotes a pixel of an enlargement/contraction-resultant image which is in an s-th row and a t-th column. The coordinates of a point in the original-image area which corresponds to the pixel Dst of the enlargement/contraction-resultant image agree with a lattice point in an coordinate system where lattice intervals in the X-axis direction are equal to ¼ and lattice intervals in the Y-axis direction are equal to 1/Q. When that lattice point exists in a sub area Aijmn, there are relations among the numbers "s", "t", "i", "j", "m", and "n" which are expressed by the previously-indicated equations (17) and (18) provided that each sub area contains the boundary with a left neighboring sub area and the boundary with an upper neighboring sub area but does not contain the boundary with a right neighboring sub area and the boundary with a lower neighboring sub area. Data of the pixel Dst is calculated from data of a corresponding original-image sub area according to the interpolation equations (24)–(39). When the relations (17) and (18) are satisfied, the pixel data Dst has the following relation (40) with other data.

$$\begin{aligned}
Dst &= Ds4j+n \quad (40)\\
&= F(Aijmn)\\
&= \delta n0\{\delta m0(Sij + Sij-1 + Si-1j + Si-1j-1)/4\\
&\quad + \delta m1(4Sij + 2Sij-1 + Si-1j + Si-1j-1)/8 +\\
&\quad \delta m2(4Sij + 2Sij-1 + Si+1j + Si+1j-1)/8 +\\
&\quad \delta m3(Sij + Sij-1 + Si-1j + Si+1j-1)/4 +\\
&\quad \delta n1\{\delta m0(4Sij + 2Si-1j + Sij-1 +\\
&\qquad Si-1j-1)/8 +\\
&\quad \delta m1 Sij +\\
&\quad \delta m2 Sij +\\
&\quad \delta m3(4Sij + 2Si+1j + Sij-1 + Si+1j-1)/8\} +\\
&\quad \delta n2\{\delta m0(4Sij + 2Si-1j + Sij+1 +\\
&\qquad Si-1j+1)/8 +\\
&\quad \delta m1 Sij +\\
&\quad \delta m2 Sij +\\
&\quad \delta m3(4Sij + 2Si+1j + Sij+1 + Si+1j+1)/8\} +\\
&\quad \delta n3\{\delta m0(Sij + Sij+1 + Si-1j + Si-1j+1)/4\\
&\quad + \delta m1(4Sij + 2Sij+1 + Si-1j + Si-1j+1)/8 +\\
&\quad \delta m2(4Sij + 2Sij+1 + Si+1j + Si+1j+1)/8 +\\
&\quad \delta m3(Sij + Sij+1 + Si+1j + Si+1j+1)/4\}
\end{aligned}$$

where the character δmn denotes a value which equals "1" when m=n and which equals "0" otherwise.

It is understood from the equation (40) that the coordinates of points within the original-image area which correspond to pixels Ds4j, Ds4j+1, Ds4j+2, and Ds4j+3 of the enlargement/contraction-resultant image exist in the sub areas Aijm0, Aijm1, Aijm2, and Aijm3 respectively, and that neighboring pixels in a same row of the enlargement/contraction-resultant image correspond to different original-image sub areas respectively which neighbor each other and which are in a same row. Thus, provided that the row of the original-image sub areas corresponding to the pixels Ds4j, Ds4j+1, Ds4j+2, and Ds4j+3 of the enlargement/contraction-resultant image is determined respectively, the corresponding original-image sub areas can be determined and also the data of the pixels Ds4j, Ds4j+1, Ds4j+2, and Ds4j+3 of the enlargement/contraction-resultant image can be determined by referring to the equation (40) respectively.

The equation (40) is simplified into the following equations (41), (42), (43), and (44) when the number "n" equals "0", "1", "2", and "3" respectively.

$$\begin{aligned}
Ds4j &= F(Aijm0) \quad (41)\\
&= \delta m0(Sij + Sij-1 + Si-1j + Si-1j-1)/4 +\\
&\quad \delta m1(4Sij + 2Sij-1 + Si-1j + Si-1j-1)/8 +\\
&\quad \delta m2(4Sij + 2Sij-1 + Si+1j + Si+1j-1)/8 +\\
&\quad \delta m3(Sij + Sij-1 + Si+1j + Si+1j-1)/4
\end{aligned}$$

-continued $$Ds4j+1 = F(Aijm1) \quad (42)$$
$$= \delta m0(4Sij + 2Si-1j + Sij-1 + Si-1j-1)/8 +$$
$$\delta m1Sij +$$
$$\delta m2Sij +$$
$$\delta m3(4Sij + 2Si+1j + Sij-1 + Si+1j-1)/8$$

$$Ds4j+2 = F(Aijm2) \quad (43)$$
$$= \delta m0(4Sij + 2Si-1j + Sij+1 + Si-1j-1)/8 +$$
$$\delta m1Sij +$$
$$\delta m2Sij +$$
$$\delta m3(4Sij + 2Si+1j + Sij+1 + Si+1j+1)/8$$

$$Ds4j+3 = F(Aijm3) \quad (44)$$
$$= \delta m0(Sij + Sij+1 + Si-1j + Si-1j+1)/4 +$$
$$\delta m1(4Sij + 2Sij+1 + Si-1j + Si-1j+1)/8 +$$
$$\delta m2(4Sij + 2Sij+1 + Si+1j + Si+1j+1)/8 +$$
$$\delta m3(Sij + Sij+1 + Si+1j + Si+1j+1)/4$$

Thus, the data of the pixels Ds4j, Ds4j+1, Ds4j+2, and Ds4j+3 of the enlargement/contraction-resultant image can be simultaneously generated from the original-image pixel data Sij, Si−1j, Sij−1, Si+1j, Sij+1, Si−1j−1, Si−1j+1, Si+1j−1, and Si+1j+1 by executing the calculations of the equations (41), (42), (43), and (44) in parallel or simultaneously.

Figure 22:
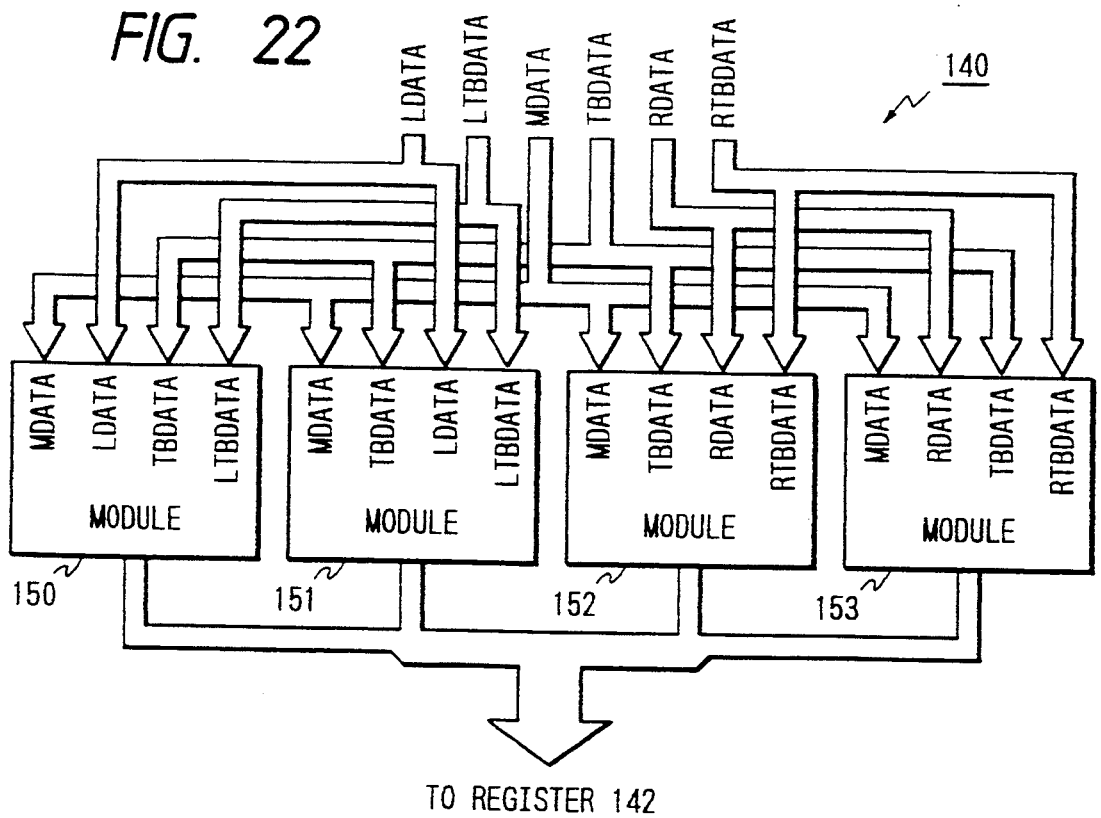
FIG. 22 is a block diagram of a quadruple interpolation enlarging module in FIG. 22.

The simultaneous execution of the calculations of the equations (41), (42), (43), and (44) is done by the quadruple interpolation enlarging modules 140 and 141 in the quadruple interpolation enlarging unit 134. The quadruple interpolation enlarging modules 140 and 141 have similar structures, and only the quadruple interpolation enlarging module 140 will be described in detail. As shown in FIG. 22, the quadruple interpolation enlarging module 140 includes interpolation calculation modules 150, 151, 152, and 153 for executing the calculations of the equations (41), (42), (43), and (44) respectively in response to a control signal fed from the controller 139 (see FIG. 20). The interpolation calculation modules 150, 151, 152, and 153 have similar structures, and only the interpolation calculation module 150 will be described in detail.

Figure 23:
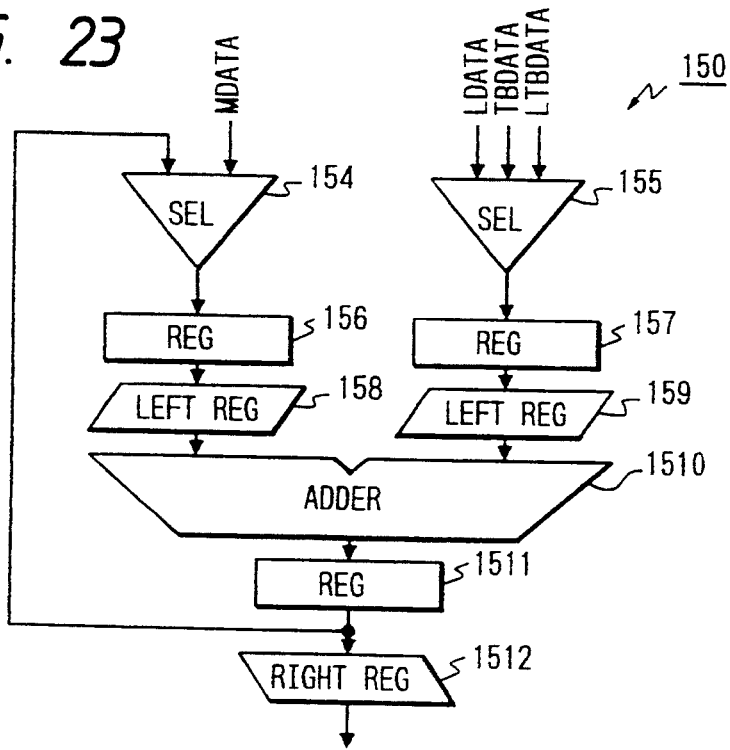
FIG. 23 is a block diagram of an interpolation calculation module in FIG. 22.

As shown in FIG. 23, the interpolation calculation module 150 includes data selectors 154 and 155, 28-bit registers 156 and 157, leftward shifters 158 and 159, a 28-bit adder 1510, a 28-bit register 1511, and a rightward shifter 1512. The data selector 154 serves to select one of input data MDATA and an output data from the register 1511. The data selector 154 outputs the selected data to the register 156, and the selected data is transmitted to the leftward shifter 158 via the register 156. The leftward shifter 158 shifts the received data leftward by bit from 0 to 2 bits, and outputs the shift-resultant data to the adder 1510. The data selector 155 serves to select one of input data LDATA, input data TBDATA, and input data LTBDATA. The data selector 155 outputs the selected data to the register 157, and the selected data is transmitted to the leftward shifter 159 via the register 157. The leftward shifter 159 shifts the received data leftward with respect to bit positions, and outputs the shift-resultant data to the adder 1510. The adder 1510 adds the output data from the leftward shifter 158 and the output data from the leftward shifter 159, and stores the addition-resultant data into the register 1511. The output data from the register 1511 is fed to the rightward register 1512 and also the data selector 154. The rightward register 1512 shifts the received data rightward with respect to bit positions. The output data from the rightward shifter 1512 is stored into the register 142 (see FIG. 21).

When m=1, the interpolation calculation module 150 executes the calculation of the equation (41) as follows. In this case, the reference data selector 133 (see FIG. 20) selects original-image pixel data Sij, Sij−1, Si−1j, and Si−1j−1, and outputs the selected pixel data Sij, Sij−1, Si−1j, and Si−1j−1 to the interpolation calculation module 150 as input data MDATA, LDATA, TBDATA, and LTBDATA respectively. The selector 154 selects the input data MDATA and outputs the selected data MDATA to the register 156, and the selected data MDATA is transmitted to the leftward shifter 158 via the register 156. The leftward shifter 158 shifts the received data leftward by two bits, and outputs the shift-resultant data to the adder 1510. The selector 155 selects the input data LDATA and outputs the selected data LDATA to the register 157, and the selected data LDATA is transmitted to the leftward shifter 159 via the register 157. The leftward shifter 159 shifts the received data leftward by one bit, and outputs the shift-resultant data to the adder 1510. The adder 1510 adds the output data from the leftward shifter 158 and the output data from the leftward shifter 159, and stores the addition-resultant data into the register 1511. Then, the selector 154 selects the output data from the register 1511 and outputs the selected data to the register 156, and the selected data is transmitted to the leftward shifter 158 via the register 156. The leftward shifter 158 shifts the received data leftward by 0 bit, and outputs the shift-resultant data to the adder 1510. The selector 155 selects the input data TBDATA and outputs the selected data TBDATA to the register 157, and the selected data TBDATA is transmitted to the leftward shifter 159 via the register 157. The leftward shifter 159 shifts the received data leftward by 0 bit, and outputs the shift-resultant data to the adder 1510. The adder 1510 adds the output data from the leftward shifter 158 and the output data from the leftward shifter 159, and stores the addition-resultant data into the register 1511. Next, the selector 154 selects the output data from the register 1511 and outputs the selected data to the register 156, and the selected data is transmitted to the leftward shifter 158 via the register 156. The leftward shifter 158 shifts the received data leftward by 0 bit, and outputs the shift-resultant data to the adder 1510. The selector 155 selects the input data LTBDATA and outputs the selected data LTBDATA to the register 157, and the selected data LTBDATA is transmitted to the leftward shifter 159 via the register 157. The leftward shifter 159 shifts the received data leftward by 0 bit, and outputs the shift-resultant data to the adder 1510. The adder 1510 adds the output data from the leftward shifter 158 and the output data from the leftward shifter 159, and stores the addition-resultant data into the register 1511. Then, the rightward shifter 1512 receives the output data from the register 1511, and shifts the received data rightward by three bits. The output data from the rightward shifter 1512 is stored into the register 142 (see FIG. 21).

When m=0, m=2, or m=3, the interpolation calculation module 150 executes the calculation of the equation (41) by similarly reiterating additions including shifting processes. It should be noted that the reference data selector 133 (see FIG. 20) selects original-image pixel data Sij, Sij−1, Si+1j, and Si+1j−1, and outputs the selected pixel data Sij, Sij−1, Si+1j, and Si+1j−1 to the interpolation calculation module 150 as input data MDATA, LDATA, TBDATA, and LTBDATA respectively when m=2 or 3.

Regarding the operation of the interpolation calculation modules 151, 152, and 153, the reference data selector 133 (see FIG. 20) selects necessary original-image pixel data, and outputs the selected pixel data to the interpolation calculation modules 151, 152, and 153. Similarly to the execution of the calculation of the equation (41) by the interpolation calculation module 150, the interpolation calculation modules 151, 152, and 153 execute the calculations of the equations (42), (43), and (44) respectively by reiterating additions including shifting processes.

The interpolation calculation modules 150, 151, 152, and 153 simultaneously execute the calculations so that parallel (simultaneous) execution of the calculations of the equations (41), (42), (43), and (44) can be realized. Similarly, in the quadruple interpolation enlarging module 141, four interpolation calculation modules realize parallel execution of calculations of the equations (41), (42), (43), and (44).

The calculation executed by each interpolation calculation module depends on the value "m". The value "m" is calculated by the sub-area row calculation unit 130 (see FIG. 20), and the information of the calculated value "m" is stored into the reference data file 132 (see FIG. 20) together with the reference data. At the time of the transfer of the reference data from the reference data file 132 to registers within the reference data selector 133 (see FIG. 20), the information of the value "m" is also read out from the reference data file 132. The controller 139 controls each interpolation calculation module in response to the readout value "m" so that the calculation executed by the interpolation calculation module can depend on the value "m".

One interpolation calculation module generates 1-word (1-pixel) data. Thus, one quadruple interpolation enlarging module generates 4-word (4-pixel) data, and the quadruple interpolation enlarging unit 134 generates 8-word (8-pixel) data.

As described previously, the data processing executed by the quadruple interpolation enlarging unit 134 depends on the value "m", the information of which is stored into the reference data file 132 together with the reference data. It is unnecessary for the sub-area row calculation unit 130 to suspend the calculation of the sub-area row number until the quadruple interpolation enlarging unit 134 completes the processing of the reference data corresponding to the previously-calculated sub-area row number. Thus, when the reference data file 132 is fully occupied so that the reference data address generation unit 131 suspends the address generation, the sub-area row calculation unit 130 is inhibited from calculating a next sub-area row number. Otherwise, the sub-area row calculation unit 130 is permitted to calculate a next sub-area row number.

The X-direction enlarging/contracting unit 135 will now be described in detail. In the case where the image enlarging/contracting apparatus is required to enlarge or contract an original image by P times in the X-axis direction, the X-direction enlarging/contracting unit 135 processes the output data from the quadruple interpolation enlarging unit 134 to enlarge or contract an image, represented by the output data from the quadruple interpolation enlarging unit 134, by P/4 times.

Figure 24:
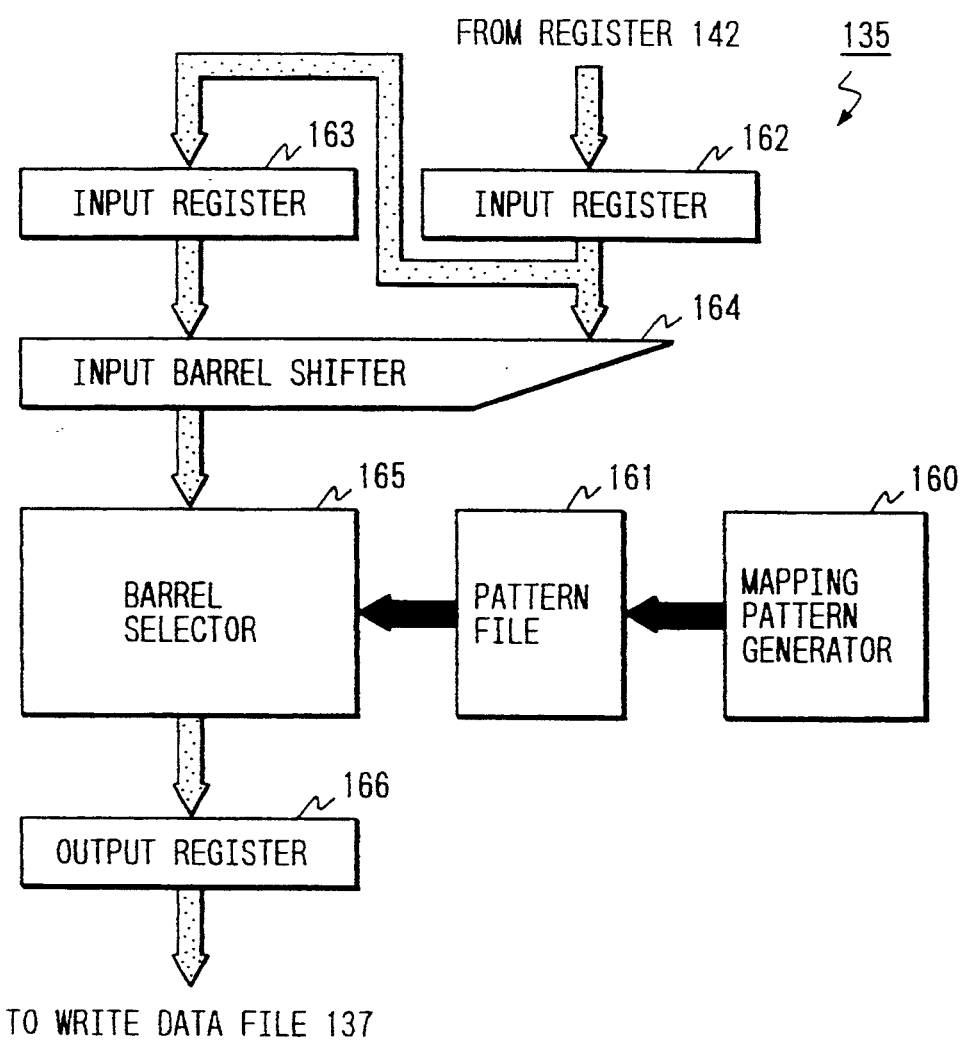
FIG. 24 is a block diagram of an X-direction enlarging/contracting unit in FIG. 20.

As shown in FIG. 24, the X-direction enlarging/contracting unit 135 includes a mapping pattern generator 160, a pattern register file 161, input data registers 162 and 163, an input barrel shifter 164, a barrel selector 165, and an output data register 166. The mapping pattern generator 160 serves to produce a mapping pattern which is stored into the pattern register file 161. The pattern register file 161 has a capacity of, for example, 128 bytes. The input data register 162 follows the register 142 in the quadruple interpolation enlarging unit 134 (see FIG. 21), and serves to store 8-word data. The input data register 163 follows the input data register 162, and serves to store 8-word data. The input data registers 162 and 163 are successively followed by the input barrel shifter 164 and the barrel selector 165. The input barrel shifter 164 functions to shift input data leftward word by word from 0 to 7 words. The barrel selector 165 is connected to the pattern register file 161. The barrel selector 165 serves to expand or compress input data by a copying process or a thinning-out process which is executed in accordance with the mapping pattern fed from the pattern resister file 161. The output data register 166 follows the barrel selector 165. The output data register 166 serves to store 8-word data. The output data register 166 is followed by the write data file 137 (see FIG. 20).

The mapping pattern is a pattern composed of binary data which is used for mapping pixel data in accordance with the magnification (that is, the enlargement/contraction rate). The mapping pattern is previously produced by the mapping pattern generator 160 in accordance with data of successive pixels in the X-axis direction, and is stored in the pattern register file 161 one byte by one byte. The mapping pattern is inputted into the barrel selector 165 one byte by one byte as a control signal, and input data of successive pixels in the X-axis direction are processed in accordance with the mapping pattern. The X-direction enlarging/contracting unit 135 executes same processing on input data for every row, and processing on a next row uses the same mapping pattern in the pattern register file 161.

Figure 25:
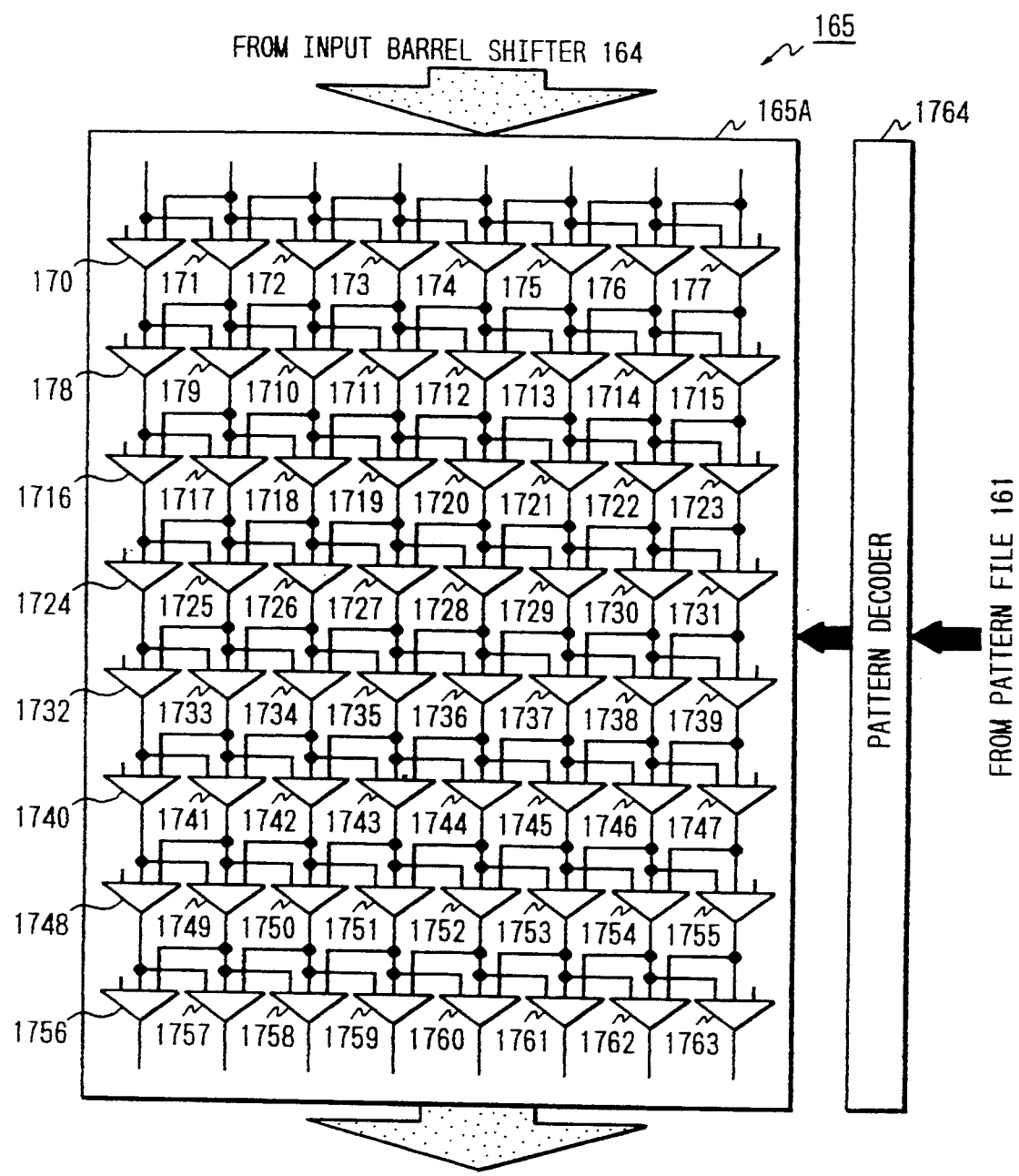
FIG. 25 is a block diagram of a barrel selector in FIG. 24.

As shown in FIG. 25, the barrel selector 165 includes an array 165A of 64 selectors 170–1763 of a 24-bit and 3-input 1-output type, and a pattern decoder 1764. The selector array 165A is connected between the input barrel shifter 164 and the output data register 166 (see FIG. 24). The selector array 165A is also connected to the pattern decoder 1764. The pattern decoder 1764 is connected to the pattern register file 161 (see FIG. 24). The pattern decoder 1764 generates control signals on the basis of the mapping pattern informed by the pattern register file 161. The selector array 165A has 8 rows and 8 columns. Each of the selectors 170–1763 serves to select one of three pieces of 24-bit input data in accordance with a control signal fed from the pattern decoder 1764.

In the case where P/4<1 so that the X-direction enlarging/contracting unit 135 executes a contracting process, the selector array 165A thins out 8-word input data into [2P]-word or ([2P]+1)-word data in response to control signals fed from the pattern decoder 1764. Here, the character [2P] denotes the largest integer not greater than the value 2P. The selector array 165A outputs the [2P]-word or ([2P]+1)-word data. The input mapping pattern determines which of the [2P]-word data and the ([2P]+1)-word data should be outputted.

In the case where 1≦P/4 so that the X-direction enlarging/contracting unit 135 executes an enlarging process, the selector array 165A copies a portion of [32/P]-word or ([32/P]+1)-word input data in response to control signals fed from the pattern decoder 1764, and thereby expands the input data into 8-word data. Here, the character [32/P] denotes the largest integer not greater than the value 32/P, and the number ([32/P]+1) is not greater than 8. The selector array 165A outputs the 8-word data. The input mapping pattern determines which of the [32/P]-word data and the ([32/P]+1)-word data should be used as input data.

It should be noted that the algorithm of the parallel (simultaneous) enlarging/contracting process executed by the barrel selector 165 is well-known in the art.

It is necessary that data inputted into the barrel selector 165 is equal to data of pixels successively arranged in the X-axis direction at positions starting from the left-hand edge. The input data registers 162 and 163, and the input barrel shifter 164 cooperate to feed input data of such a format to the barrel selector 165.

In the case where P/4<1, the barrel selector 165 receives 8-word data. Each time the barrel selector 165 generates data, data is transferred from the input data register 162 to the input data register 163 while data is transferred from the register 142 of the quadruple interpolation enlarging unit 134 (see FIG. 21) to the input data register 162. In addition, the input barrel shifter 164 receives data from the input data registers 162 and 163, and shifts the received data leftward by 0 word to enable a set of the data positions to start from the left-hand edge.

In the case where 1≦P/4, the barrel selector 165 receives [32/P]-word or ([32/P]+1)-word data, and thus the number of words of the received data is always equal to or smaller than 8. Thus, until the processing of all data in the input data register 163 is completed, the transfer of data from the input data register 162 to the input data register 163 remains suspended. Each time the processing of all data in the input data register 163 is completed, data is transferred from the input data register 162 to the input data register 163 while data is transferred from the register 142 of the quadruple interpolation enlarging unit 134 (see FIG. 21) to the input data register 162. In this case, the amount of the data shift by the input barrel shifter 164 corresponds to a value which results from accumulatively adding the word numbers of the input data processed by the barrel selector 165. It should be noted that, in this accumulative addition, 8 is subtracted from the addition result each time the addition result exceeds 8. Thus, until the processing of all data in the input data register 163 is completed, the word numbers continue to be accumulatively added. When the processing of all data in the input data register 163 is completed (at this time, the addition result exceeds 8), data is transferred from the input data register 162 to the input data register 163 while data is transferred from the register 142 of the quadruple interpolation enlarging unit 134 (see FIG. 21) to the input data register 162. In addition, the amount of the data shift by the input barrel shifter 164 is made equal to the accumulative addition result minus 8. Thereby, the barrel selector 165 receives unprocessed data of pixels successively arranged in the X-axis direction at positions starting from the left-hand edge. The output data from the barrel selector 165, that is, the data selected by the selector array 165A, is stored into the output data register 166, and is then transferred to the write data file 137 (see FIG. 20) word by word.

With reference to FIG. 20, the sub-area row calculation unit 130 is controlled by the controller 138 so that the sub-area row calculation unit 130 can calculate a row number of an original-image sub area corresponding to a row of pixels in an enlargement-contraction-resultant image. In addition, the reference data address generation unit 131 is controlled by the controller 138 so that the reference data address generation unit 13 1 can generate addresses of words of data in two rows adjacent to a corresponding sub area on the basis of the row number calculated by the sub-area row calculation unit 130.

Figure 26:
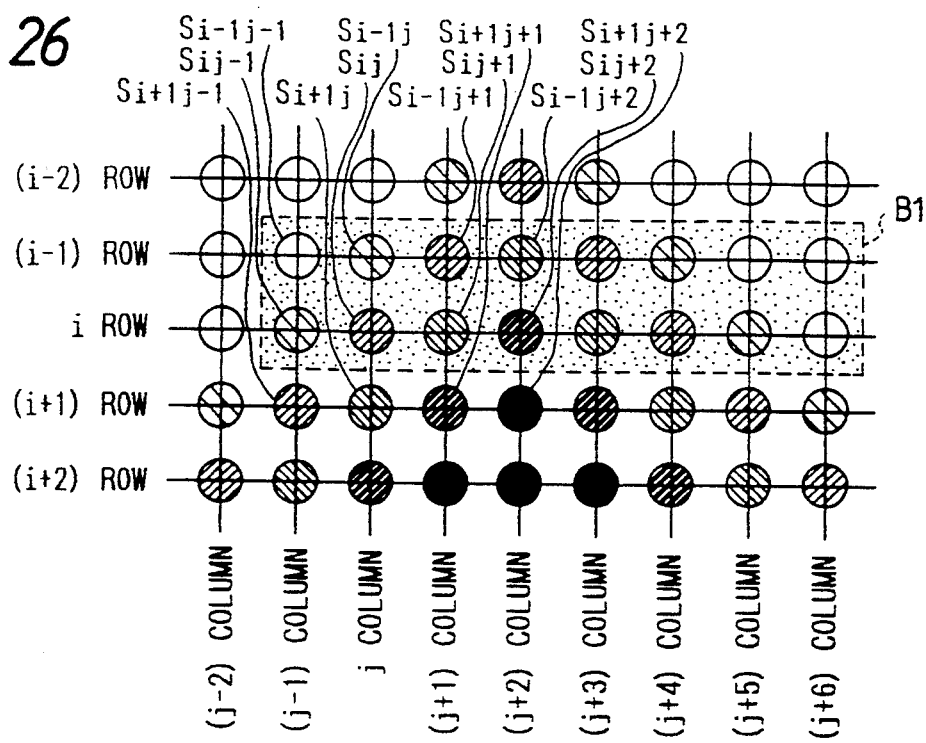
FIG. 26 is a diagram of an array of data of pixels in a memory in the image enlarging/contracting apparatus of FIG. 20.
Figure 27:
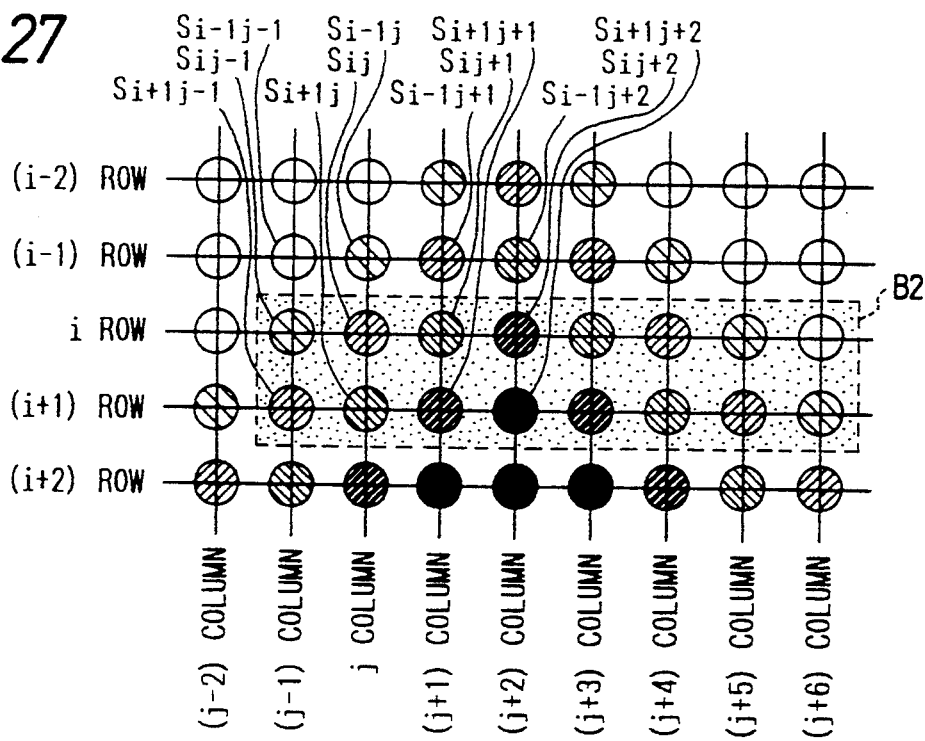
FIG. 27 is a diagram of an array of data of pixels in a memory in the image enlarging/contracting apparatus of FIG. 20.

The reference data address generation unit 131 operates as follows. In the case where data of pixels in an s-th row of an enlargement/contraction-resultant image are required to be generated, the reference data address generation unit 131 produces addresses of words in an i-th row and an (i−1)-th row when the row number "m" calculated by the sub-area row calculation unit 130 equals "0" or "1", and produces address of words in an i-th row and an (i+1)-th row when the row address number "m" equals "2" or "3". It should be noted that the number "i" satisfies the equation (17). FIGS. 26 and 27 show an array of data of pixels which is stored in the source-image memory 750 (see FIG. 20). In FIGS. 26 and 27, window regions B1 and B2 contain pixels, the addresses of which are generated. In order to generate addresses of words in the i-th row and the (i−1)-th row as shown in FIG. 26, the word address of the i-th row (j-1)-th column pixel Sij−1 is generated and then the word address of the (i−1)-th row (j-1)-th column pixel Si−1j−1 is generated. Thereafter, the word address of the i-th row j-th column pixel Sij, the word address of the (i−1)-th row j-th column pixel Si−1j, the word address of the i-th row (j+1)-th column pixel Sij+1, and the word address of the (i−1)-th row (j+1)-th column pixel Si−1j+1 are successively generated. In order to generate addresses of words in the i-th row and the (i+1)-th row as shown in FIG. 27, the word address of the i-th row (j-1)-th column pixel Sij−1 is generated and then the word address of the (i+1)-th row (j-1)-th column pixel Si+1j−1 is generated. Thereafter, the word address of the i-th row j-th column pixel Sij, the word address of the (i+1)-th row j-th column pixel Si+1j, the word address of the i-th row (j+1)-th column pixel Sij+1, and the word address of the (i+1)-th row (j+1)-th column pixel Si+1j+1 are successively generated. The reference data address generation unit 131 sequentially outputs the generated addresses to the source-image memory 750, and the word data are sequentially read out from the storage segments of the source-image memory 750 which are designated by the addresses. The readout word data are stored into the reference data file 132 (see FIG. 20).

The reference data file 132 includes 8 registers of the 30-bit type. The reference data file 132 stores up to 8 words of the data read out from the source-image memory 750. Each 1-word data read out from the source-image memory 750 is stored into 24 upper bits of a 30-bit register, and 4-bit information and 2-bit information are stored into the remaining 6 bits of the 30-bit register. The 4-bit information includes data representing the position of the 1-word data relative to the original-image region, more specifically 4 flag bits for indicating that the 1-word data is in the upper edge, the lower edge, the left edge, and the right edge of the original-image region respectively. The 2-bit information includes data representing the sub-area row number which is calculated by the sub-area row calculation unit 130.

The reference data selector 133 will now be described in detail. As described previously, the reference data selector 133 is controlled by the controller 139. The reference data selector 133 receives reference data from the reference data file 132, and subjects the received reference data to a selecting process. The reference data selector 133 feeds selected reference data LDATA, LTBDATA, MDATA, TBDATA, RDATA, RTBDATA, LDATB, LTBDATB, MDATB, TBDATB, RDATB, and RTBDATB to the quadruple interpolation enlarging unit 134.

As shown in FIG. 28, the reference data selector 133 includes a left reference data register 190, a main reference data register 191, a main reference data register 192, a right reference data register 193, a left upper/lower reference data register 194, an upper/lower reference data register 195, an upper/lower reference data register 196, and a right upper/lower reference data register 197. The registers 190–197 are of the 1-word type. The data outputted from the reference data file 132 is stored into the registers 192, 193, 196, and 197. Data outputted from the left reference register 190 is fed to the quadruple interpolation enlarging unit 134 as data LDATA. Data outputted from the main reference register 191 is fed to the quadruple interpolation enlarging unit 134 as data MDATA and LDATB. Data outputted from the main reference register 192 is fed to the quadruple interpolation enlarging unit 134 as data MDATB and RDATA. Data outputted from the right reference register 193 is fed to the quadruple interpolation enlarging unit 134 as data RDATB. Data outputted from the left upper/lower reference register 194 is fed to the quadruple interpolation enlarging unit 134 as data LTBDATA. Data outputted from the upper/lower reference register 195 is fed to the quadruple interpolation enlarging unit 134 as data TBDATA and LTBDATB. Data outputted from the upper/lower reference register 196 is fed to the quadruple interpolation enlarging unit 134 as data TBDATB and RTBDATA. Data outputted from the right upper/lower reference register 197 is fed to the quadruple interpolation enlarging unit 134 as data RTBDATB.

Each time the quadruple interpolation enlarging unit 134 executes a quadruple interpolation enlarging process, the transfer of data from the main reference data register 192 to the left reference data register 190, the transfer of data from the right reference data register 193 to the main reference data register 191, the transfer of data from the right upper/lower reference data register 197 to the upper/lower reference data register 195, and the transfer of data from the upper/lower reference data register 196 to the left upper/lower reference data register 194 are performed. In addition, pieces of data are transferred from the reference data file 132 to the main reference data register 192, the upper/lower reference data register 196, the right reference register 193, and the right upper/lower reference data register 197 in a sequence which agrees with the order of storing the pieces of the data into the reference data file 132. Addresses are generated and fed to the source-image memory 750 in the previously-mentioned sequence and pieces of corresponding data are read out from the source-image memory, and the pieces of the readout data are stored into the reference data file 132. Thus, in the case where the quadruple interpolation enlarging unit 134 generates pixel data Ds4j, Ds4j+1, Ds4j+2, Ds4j+3, Ds4(j+1), Ds4(j+1)+1, Ds4(j+1)+2, and Ds4(j+1)+3, when the addresses of words in the i-th row and the (i−1)-th row are generated as shown in FIG. 26, the left reference data register 190, the main reference data register 191, the main reference data register 192, the right reference data register 193, the left upper/lower reference data register 194, the upper/lower reference data register 195, the upper/lower reference data register 196, and the right upper/lower reference data register 197 are loaded with data Sij−1, data Sij, data Sij+1, data Si(j1+1)+1, data Si−1j−1, data Si−1j, data Si−1j+1, and data Si−1(j+1)+1 respectively. On the other hand, when the addresses of words in the i-th row and the (i+1)-th row are generated as shown in FIG. 27, the left reference data register 190, the main reference data register 191, the main reference data register 192, the right reference data register 193, the left upper/lower reference data register 194, the upper/lower reference data register 195, the upper/lower reference data register 196, and the right upper/lower reference data register 197 are loaded with data Sij−1, data Sij, data Sij+1, data Si(j1+1)+1, data Si+1j−1, data Si+1j, data Si+1j+1, and data Si+1(j+1)+1 respectively. Thus, the reference data is correctly fed to the quadruple interpolation enlarging unit 134.

The write data address generation unit 136 is controlled by the controller 1310 so as to generate an address of a storage segment of the object-image memory 760 into which the enlargement/contraction-resultant data will be written.

The write data file 137 includes a 24-bit 16-word register file, and is controlled by the controller 1310. The data generated by the X-direction enlarging/contracting unit 135 is transferred from the output data register 166 (see FIG. 24) to the write data file 137. Pieces of data are sequentially outputted from the write data file 137, and are sequentially written into storage segments of the object-image memory 760 which are designated by the addresses fed from the write data address generation unit 136.

The operations of the devices 130–137 and the data transfer among the devices 130–137 are controlled in parallel (simultaneously) by the controllers 138, 139, and 1310. The devices 130–137 are separated into three groups, and the controllers 138, 139, and 1310 are assigned to the groups respectively. Thus, the control loads on the controllers 138, 139, and 1310 are small so that the above-mentioned parallel control can be realized by a small circuit scale.

It should be noted that the quadruple interpolation enlarging modules 140 and 141 of FIGS. 21 and 22 may also be made of a ROM (read only memory) storing data corresponding to the equations (41), (42), (43), and (44). In this case, data fed from the reference data selector 133 is applied to the ROM as an address, and interpolation data is outputted from the ROM.

The controllers 138, 139, and 13 10 may also be composed of a multi-process MPU (micro processing unit) which simultaneously execute a plurality of processes for controlling the devices 130–137.

What is claimed is:

1. An apparatus for processing image data to enlarge and contract an original image, represented by the data, by P times in an X-axis direction while interpolating the data, P denoting an arbitrary positive rational number, the apparatus comprising:

means for allowing a supposition that each of regions among pixels of the original image is divided into sub areas having a number of N by M, that is, N in the X-axis direction and M in a Y-axis direction, N denoting an arbitrary integer equal to or greater than 2, M denoting an arbitrary integer equal to or greater than 1;

an N-time interpolation enlarging means for executing an interpolation process determined by an original-image sub area corresponding to a pixel of an enlargement/contraction-resultant image while simultaneously generating a plurality of pieces of process-resultant data representing a part of an image enlarged from the original image by N times in the X-axis direction; and an arbitrary-magnification enlarging/contracting means for subjecting the plurality of the pieces of the process-resultant data to image enlargement and contraction at an arbitrary magnification in the X-axis direction without executing interpolation, and thereby for processing the plurality of the pieces of the process-resultant data to enlarge and contract an image, represented by the plurality of the pieces of the process-resultant data, by P/N times in the X-axis direction.

2. An apparatus for processing image data to enlarge and contract an original image, represented by the data, by P times in an X-axis direction and Q times in a Y-axis direction while interpolating the data, P and Q denoting arbitrary positive rational numbers respectively, the apparatus comprising:

means for allowing a supposition that each of regions among pixels of the original image is divided into sub areas having a number N by M, that is, N in the X-axis direction and M in a Y-axis direction, N denoting an arbitrary integer equal to or greater than 2, M denoting an arbitrary integer equal to or greater than 1;

an N-time interpolation enlarging means for executing an interpolation process determined by an original-image sub area corresponding to a pixel of an enlargement/contraction-resultant image while simultaneously generating a plurality of pieces of process-resultant data representing a part of an image enlarged from the original image by N times in the X-axis direction;

an arbitrary-magnification enlarging/contracting means for subjecting the plurality of the pieces of the process-resultant data to image enlargement and contraction at an arbitrary magnification in the X-axis direction without executing interpolation, and thereby for processing the plurality of the pieces of the process-resultant data to enlarge and contract an image, represented by the plurality of the pieces of the process-resultant data, by P/N times in the X-axis direction;

a sub-area row calculating means for calculating a row number of an original-image sub area corresponding to pixels in a same row of an enlargement/contraction-resultant image, the row extending in the X-axis direction;

a reference data address generating means for generating addresses of pixel data on a source-image memory to which the N-time interpolation enlarging means refers;

a selecting means for selecting a plurality of data from among data read out from the source-image memory as reference data, wherein the reference data selected by the selecting means are referred to by the N-time interpolation enlarging means every process;

a write data address generating means for generating an address on an object-image memory into which data processed by the arbitrary-magnification enlarging/contracting means is written; and a control means for controlling transfer of the plurality of the image data from the N-time interpolation enlarging means to the arbitrary-magnification enlarging/contracting means.

3. An apparatus for processing image data to enlarge and contract an original image, represented by the data, by P times in an X-axis direction and Q times in a Y-axis direction while interpolating the data, P and Q denoting arbitrary positive rational numbers respectively, the apparatus comprising:

means for allowing a supposition that each of regions among pixels of the original image is divided into sub areas having a number N by M, that is, N in the X-axis direction and M in a Y-axis direction, N denoting an arbitrary integer equal to or greater than 2, M denoting an arbitrary integer equal to or greater than 1;

an N-time interpolation enlarging means for executing an interpolation process determined by an original-image sub area corresponding to a pixel of an enlargement/contraction-resultant image while simultaneously generating a plurality of pieces of process-resultant data representing a part of an image enlarged from the original image by N times in the X-axis direction;

an arbitrary-magnification enlarging/contracting means for subjecting the plurality of the pieces of the process-resultant data to image enlargement and contraction at an arbitrary magnification in the X-axis direction without executing interpolation, and thereby for processing the plurality of the pieces of the process-resultant data to enlarge and contract an image, represented by the plurality of the pieces of the process-resultant data, by P/N times in the X-axis direction;

a sub-area row calculating means for calculating a row number of an original-image sub area corresponding to pixels in a same row of an enlargement/contraction-resultant image, the row extending in the X-axis direction;

a reference data address generating means for generating addresses of pixel data on a source-image memory to which the N-time interpolation enlarging means refers;

a selecting means for selecting a plurality of data from among data read out from the source-image memory as reference data, wherein the reference data selected by the selecting means are referred to by the N-time interpolation enlarging means every process;

a write data address generating means for generating an address on an object-image memory into which data processed by the arbitrary-magnification enlarging/contracting means is written;

a control means for controlling transfer of the plurality of the image data from the N-time interpolation enlarging means to the arbitrary-magnification enlarging/contracting means; and an interpolation information adding means for adding information to original-image data read out from the source-image memory, the information representing the sub-area row number calculated by the sub-area row calculating means;

wherein the N-time interpolation enlarging means processes the original-image data into the plurality of the pieces of the process-resultant data on the basis of the information added by the interpolation information adding means, and the arbitrary-magnification enlarging/contracting means processes the plurality of the pieces of the process-resultant data to enlarge and contract an image, represented by the plurality of the pieces of the process-resultant data, by P/N times in the X-axis direction.

4. The apparatus of claim 1, wherein the N-time interpolation enlarging means comprises an N-time interpolation enlarging unit which includes a plurality of N-time interpolation enlarging modules and a memory means for storing data processed and outputted by the N-time interpolation enlarging modules, and wherein the N-time interpolation enlarging modules include N interpolation calculation modules which determine interpolation calculation equations for the N by M sub areas respectively, and which combine the interpolation calculation equations for respective N columns, extending in the Y-axis direction, of the sub areas, the interpolation calculation equations having functions of image data in positions adjacent to the corresponding sub areas.

5. The apparatus of claim 2, wherein the N-time interpolation enlarging means comprises an N-time interpolation enlarging unit which includes a plurality of N-time interpolation enlarging modules and a memory means for storing data processed and outputted by the N-time interpolation enlarging modules, and wherein the N-time interpolation enlarging modules include N interpolation calculation modules which determine interpolation calculation equations for the N by M sub areas respectively, and which combine the interpolation calculation equations for respective N columns, extending in the Y-axis direction, of the sub areas, the interpolation calculation equations having functions of image data in positions adjacent to the corresponding sub areas.

6. The apparatus of claim 3, wherein the N-time interpolation enlarging means comprises an N-time interpolation enlarging unit which includes a plurality of N-time interpolation enlarging modules and a memory means for storing data processed and outputted by the N-time interpolation enlarging modules, and wherein the N- time interpolation enlarging modules include N interpolation calculation modules which determine interpolation calculation equations for the N by M sub areas respectively, and which combine the interpolation calculation equations for respective N columns, extending in the Y-axis direction, of the sub areas, the interpolation calculation equations having functions of image data in positions adjacent to the corresponding sub areas.

7. The apparatus of claim 1, wherein an input side of the arbitrary-magnification enlarging/contracting means and an output side of the N-time interpolation enlarging means are connected by an exclusive data bus.

8. The apparatus of claim 2, wherein an input side of the arbitrary-magnification enlarging/contracting means and an output side of the N-time interpolation enlarging means are connected by an exclusive data bus.

9. The apparatus of claim 3, wherein an input side of the arbitrary-magnification enlarging/contracting means and an output side of the N-time interpolation enlarging means are connected by an exclusive data bus.

10. The apparatus of claim 4, wherein an input side of the arbitrary-magnification enlarging/contracting means and an output side of the N-time interpolation enlarging means are connected by an exclusive data bus.

11. The apparatus of claim 5, wherein an input side of the arbitrary-magnification enlarging/contracting means and an output side of the N-time interpolation enlarging means are connected by an exclusive data bus.

12. The apparatus of claim 6, wherein an input side of the arbitrary-magnification enlarging/contracting means and an output side of the N-time interpolation enlarging means are connected by an exclusive data bus.

13. The apparatus of claim 2, wherein the control means comprises a control circuit including a programmable logic array.

14. The apparatus of claim 2, further comprising a second control means for controlling the N-time interpolation enlarging means, the arbitrary-magnification enlarging/contracting means, the sub-area row calculating means, the reference data address generating means, the selecting means, and the write data address generating means, and wherein the second control means and the control means for controlling transfer of the plurality of the image data from the N-time interpolation enlarging means to the arbitrary-magnification enlarging/contracting means comprise a control circuit including a programmable logic array.

15. The apparatus of claim 3, further comprising a second control means for controlling the N-time interpolation enlarging means, the arbitrary-magnification enlarging/contracting means, the sub-area row calculating means, the reference data address generating means, the selecting means, the write data address generating means, and the interpolation information adding means, and wherein the second control means and the control means for controlling transfer of the plurality of the image data from the N-time interpolation enlarging means to the arbitrary-magnification enlarging/contracting means comprise a control circuit including a programmable logic array.

16. The apparatus of claim 5, further comprising a second control means for controlling the N-time interpolation enlarging means, the arbitrary-magnification enlarging/contracting means, the sub-area row calculating means, the reference data address generating means, the selecting means, and the write data address generating means, and wherein the second control means and the control means for controlling transfer of the plurality of the image data from the N-time interpolation enlarging means to the arbitrary-magnification enlarging/contracting means comprise a control circuit including a programmable logic array.

17. The apparatus of claim 6, further comprising a second control means for controlling the N-time interpolation enlarging means, the arbitrary-magnification enlarging/contracting means, the sub-area row calculating means, the reference data address generating means, the selecting means, the write data address generating means, and the interpolation information adding means, and wherein the second control means and the control means for controlling transfer of the plurality of the image data from the N-time interpolation enlarging means to the arbitrary-magnification enlarging/contracting means comprise a control circuit including a programmable logic array.

18. The apparatus of claim 8, further comprising a second control means for controlling the N-time interpolation enlarging means, the arbitrary-magnification enlarging/contracting means, the sub-area row calculating means, the reference data address generating means, the selecting means, and the write data address generating means, and wherein the second control means and the control means for controlling transfer of the plurality of the image data from the N-time interpolation enlarging means to the arbitrary-magnification enlarging/contracting means comprise a control circuit including a programmable logic array.

19. The apparatus of claim 9, further comprising a second control means for controlling the N-time interpolation enlarging means, the arbitrary-magnification enlarging/contracting means, the sub-area row calculating means, the reference data address generating means, the selecting means, the write data address generating means, and the interpolation information adding means, and wherein the second control means and the control means for controlling transfer of the plurality of the image data from the N-time interpolation enlarging means to the arbitrary-magnification enlarging/contracting means comprise a control circuit including a programmable logic array.

20. The apparatus of claim 11, further comprising a second control means for controlling the N-time interpolation enlarging means, the arbitrary-magnification enlarging/contracting means, the sub-area row calculating means, the reference data address generating means, the selecting means, and the write data address generating means, and wherein the second control means and the control means for controlling transfer of the plurality of the image data from the N-time interpolation enlarging means to the arbitrary-magnification enlarging/contracting means comprise a control circuit including a programmable logic array.

21. The apparatus of claim 12, further comprising a second control means for controlling the N-time interpolation enlarging means, the arbitrary-magnification enlarging/contracting means, the sub-area row calculating means, the reference data address generating means, the selecting means, the write data address generating means, and the interpolation information adding means, and wherein the second control means and the control means for controlling transfer of the plurality of the image data from the N-time interpolation enlarging means to the arbitrary-magnification enlarging/contracting means comprise a control circuit including a programmable logic array.

22. The apparatus of claim 14, wherein the second control means and the control means for controlling transfer of the plurality of the image data from the N-time interpolation enlarging means to the arbitrary-magnification enlarging/contracting means comprise at least two control circuits including respective programmable logic arrays.

23. The apparatus of claim 2, further comprising a second control means for controlling the N-time interpolation enlarging means, the arbitrary-magnification enlarging/contracting means, the sub-area row calculating means, the reference data address generating means, the selecting means, and the write data address generating means, and wherein the second control means and the control means for controlling transfer of the plurality of the image data from the N-time interpolation enlarging means to the arbitrary-magnification enlarging/contracting means comprise a multi-process micro processing unit for simultaneously executing a plurality of processes to execute said controlling.

24. The apparatus of claim 3, further comprising a second control means for controlling the N-time interpolation enlarging means, the arbitrary-magnification enlarging/contracting means, the sub-area row calculating means, the reference data address generating means, the selecting means, the write data address generating means, and the interpolation information adding means, and wherein the second control means and the control means for controlling transfer of the plurality of the image data from the N-time interpolation enlarging means to the arbitrary-magnification enlarging/contracting means comprise a multi-process micro processing unit for simultaneously executing a plurality of processes to execute said controlling.

25. The apparatus of claim 5, further comprising a second control means for controlling the N-time interpolation enlarging means, the arbitrary-magnification enlarging/contracting means, the sub-area row calculating means, the reference data address generating means, the selecting means, and the write data address generating means, and wherein the second control means and the control means for controlling transfer of the plurality of the image data from the N-time interpolation enlarging means to the arbitrary-magnification enlarging/contracting means comprise a multi-process micro processing unit for simultaneously executing a plurality of processes to execute said controlling.

26. The apparatus of claim 6, further comprising a second control means for controlling the N-time interpolation enlarging means, the arbitrary-magnification enlarging/contracting means, the sub-area row calculating means, the reference data address generating means, the selecting means, the write data address generating means, and the interpolation information adding means, and wherein the second control means and the control means for controlling transfer of the plurality of the image data from the N-time interpolation enlarging means to the arbitrary-magnification enlarging/contracting means comprise a multi-process micro processing unit for simultaneously executing a plurality of processes to execute said controlling.

27. The apparatus of claim 8, further comprising a second control means for controlling the N-time interpolation enlarging means, the arbitrary-magnification enlarging/contracting means, the sub-area row calculating means, the reference data address generating means, the selecting means, and the write data address generating means, and wherein the second control means and the control means for controlling transfer of the plurality of the image data from the N-time interpolation enlarging means to the arbitrary-magnification enlarging/contracting means comprise a multi-process micro processing unit for simultaneously executing a plurality of processes to execute said controlling.

28. The apparatus of claim 9, further comprising a second control means for controlling the N-time interpolation enlarging means, the arbitrary-magnification enlarging/contracting means, the sub-area row calculating means, the reference data address generating means, the selecting means, the write data address generating means, and the interpolation information adding means, and wherein the second control means and the control means for controlling transfer of the plurality of the image data from the N-time interpolation enlarging means to the arbitrary-magnification enlarging/contracting means comprise a multi-process micro processing unit for simultaneously executing a plurality of processes to execute said controlling.

29. The apparatus of claim 11, further comprising a second control means for controlling the N-time interpolation enlarging means, the arbitrary-magnification enlarging/contracting means, the sub-area row calculating means, the reference data address generating means, the selecting means, and the write data address generating means, and wherein the second control means and the control means for controlling transfer of the plurality of the image data from the N-time interpolation enlarging means to the arbitrary-magnification enlarging/contracting means comprise a multi-process micro processing unit for simultaneously executing a plurality of processes to execute said controlling.

30. The apparatus of claim 12, further comprising a second control means for controlling the N-time interpolation enlarging means, the arbitrary-magnification enlarging/contracting means, the sub-area row calculating means, the reference data address generating means, the selecting means, the write data address generating means, and the interpolation information adding means, and wherein the second control means and the control means for controlling transfer of the plurality of the image data from the N-time interpolation enlarging means to the arbitrary-magnification enlarging/contracting means comprise a multi-process micro processing unit for simultaneously executing a plurality of processes to execute said controlling.

31. An apparatus for processing image data to enlarge and contract an original image, represented by the image data, by P times in a given direction while interpolating the image data, P denoting a predetermined positive rational number, the apparatus comprising:
   an N-time interpolation enlarging means for interpolating the image data into first process-resultant data representing a first process-resultant image enlarged from the original image by N times in the given direction, wherein the N-time interpolation enlarging means comprises means for simultaneously generating a plurality of signals representing a plurality of pieces of the first process-resultant data; and
   a P/N-time non-interpolation enlarging/contracting means responsive to said plurality of signals from said interpolation enlarging means for processing said plurality of signals representing the first process-resultant data into further signals representing second process-resultant data without interpolation, the second process-resultant data representing a second process-resultant image enlarged or contracted from the first process-resultant image by P/N times in the given direction, said enlarging/contracting means processing the pieces of the first process-resultant data to enlarge and contract an image represented thereby by P/N times in the given direction.

32. An apparatus for processing image signals representative of image data to enlarge and contract an original image, represented by the image data, by P times in an X-axis direction while interpolating the image data, P denoting a predetermined positive rational number,
the image data representing states of respective pixels of the original image, the apparatus comprising:
   means for dividing each of regions among pixels of the original image into sub areas having a number of N by M, that is, N in the X-axis direction and M in a Y-axis direction perpendicular to the X-axis direction, N denoting a predetermined integer equal to or greater than 2, M denoting a predetermined integer equal to or greater than 1;
   an N-time interpolation enlarging means receiving said image signals for interpolating the image data of said image signals into first process-resultant data representing states of respective pixels of a first process-resultant image enlarged from the original image by N times in the X-axis direction, wherein the N-time interpolation enlarging means comprises means for determining a sub area of the original image which corresponds to each interpolated pixel of the first process-resultant image, means for determining a state of the interpolated pixel of the first-process-resultant image on the basis of states of pixels of the original image which are adjacent to the determined sub area of the original image, and means for simultaneously generating a plurality of signals representing a plurality of pieces of the first process-resultant data which represent states of a plurality of pixels of the first process-resultant image; and
   a P/N-time enlarging/contracting means responsive to said plurality of signals from said interpolation enlarging means for processing said plurality of signals representing the first process-resultant data into further signals representing second process-resultant data without interpolation, the second process-resultant data representing states of respective pixels of a second process-resultant image enlarged or contracted from the first process-resultant image by P/N times in the X-axis direction, said enlarging/contracting means processing the pieces of the first process-resultant data to enlarge and contract an image represented thereby by P/N times in the X-axis direction.

33. A method of processing image data to enlarge and contract an original image, represented by the image data, by P times in a given direction while interpolating the image data, P denoting a predetermined positive rational number, the method comprising the steps of:
   interpolating the image data into first process-resultant data representing a first process-resultant image enlarged from the original image by N times in the given direction, wherein the interpolating step comprises simultaneously generating a plurality of signals representing a plurality of pieces of the first process-resultant data; and
   enlarging or contracting said first process-resultant image by processing said plurality of signals representing the first process-resultant data into further signals representing second process-resultant data without interpolation, the second process-resultant data representing a second process-resultant image enlarged or contracted from the first process-resultant image by P/N times in the given direction, whereby an image represented by the pieces of the first process-resultant data is enlarged and contracted by P/N times in the given direction.

* * * * *